United States Patent
Kim et al.

(10) Patent No.: US 9,936,057 B2
(45) Date of Patent: Apr. 3, 2018

(54) ELECTRONIC DEVICE

(71) Applicant: LG ELECTRONICS INC., Seoul (KR)

(72) Inventors: Byoungdoo Kim, Seoul (KR); Hyunseok Oh, Seoul (KR); Myounghoon Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/408,377

(22) Filed: Jan. 17, 2017

(65) Prior Publication Data

US 2017/0208160 A1      Jul. 20, 2017

(30) Foreign Application Priority Data

Jan. 18, 2016   (KR) .................. 10-2016-0005802

(51) Int. Cl.
| | |
|---|---|
| *H04M 1/00* | (2006.01) |
| *H04B 1/38* | (2015.01) |
| *H04M 1/02* | (2006.01) |
| *G04B 19/00* | (2006.01) |

(52) U.S. Cl.
CPC .......... *H04M 1/0266* (2013.01); *G04B 19/00* (2013.01); *H04M 1/0262* (2013.01); *H04M 1/0277* (2013.01); *H04M 2250/22* (2013.01)

(58) Field of Classification Search
CPC .... H04B 1/3827; H04B 1/3861; H04B 1/385; H04M 1/0262; H04M 1/0266; H04M 1/72519; H04M 1/7253; G04G 9/00; G04G 9/0064; G04G 17/00; G04G 17/045; G04G 17/08; G04G 19/00; G04G 21/00; G04G 21/04

USPC ............... 455/90.3, 556.1, 557, 566
See application file for complete search history.

(56) References Cited

U.S. PATENT DOCUMENTS

| | | | |
|---|---|---|---|
| 7,408,846 B2 * | 8/2008 | Brodmann ........... | A44C 5/0092 368/228 |
| 8,902,714 B2 * | 12/2014 | Gossweiler, III ...... | G04G 21/08 368/10 |
| 9,245,165 B2 * | 1/2016 | Slaby ................. | G06K 9/00013 |
| 9,521,245 B2 * | 12/2016 | Yang ..................... | G04G 21/04 |
| 2006/0203621 A1 | 9/2006 | Brodmann | |
| 2009/0069045 A1 | 3/2009 | Cheng | |

(Continued)

FOREIGN PATENT DOCUMENTS

| | | |
|---|---|---|
| JP | 2002298129 | 10/2002 |
| KR | 1020150101599 | 9/2015 |

OTHER PUBLICATIONS

PCT International Application No. PCT/KR2017/000589, International Search Report dated Apr. 20, 2017, 3 pages.

*Primary Examiner* — Quochien B Vuong
(74) *Attorney, Agent, or Firm* — Lee, Hong, Degerman, Kang & Waimey

(57) ABSTRACT

An electronic device is disclosed. The electronic device according to an embodiment of the present invention may include a first watch module and a second watch module. The first watch module may include a first body, a watch movement, a first window, and a watch hand. The second watch module may include a second body extended from the first body, a circuit board, a second window, and a second display. The first body and the second body may form a bending, and are communicated to each other.

14 Claims, 25 Drawing Sheets

(56) References Cited

U.S. PATENT DOCUMENTS

2015/0049591 A1    2/2015  Adams et al.
2016/0004224 A1*   1/2016  Pi .......................... G04G 21/025
                                                              368/10

* cited by examiner

ELECTRONIC DEVICE

Pursuant to 35 U.S.C. § 119(a), this application claims the benefit of earlier filing date and right of priority to Korean Patent Application No. 10-2016-0005802, filed on Jan. 18, 2016, the contents of which are all hereby incorporated by reference herein in its entirety.

BACKGROUND OF THE INVENTION

Field of the Invention

The present invention relates to an electronic device. In particular, the present invention relates to an electronic device in which an analog watch and a smart watch are structurally coupled.

Background of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As the functions of the mobile terminal are being diversified, for example, the mobile terminal is implemented as a multimedia player form with the multiple functions such as photographing of photos or video, playing music or video files, game, or reception of broadcasting.

It may be considered that structural parts and/or software parts of the mobile terminal improves in order to support and increase the functions of the mobile terminal.

Recently, research on a wearable type of an electronic device worn on the user's body has been in progress. For example, an attempt for the electronic device of glass type and watch type has been made.

Because the case of the wearable type of the electronic device meets the design requirements of the electronic device and needs to be arranged in a limited space, the need for an optimized design has been increasing.

SUMMARY OF THE INVENTION

An object of the present invention is to solve the foregoing problems and other problems.

Another object of the present invention is to provide independent function of an analog watch in a smart watch.

Another object of the present invention is to provide independent function of a smart watch in an analog watch.

The other object of the present invention is to provide a complementary effect of an analog watch and a smart watch.

According to an aspect of the present invention to achieve the above or other objects, the present invention may provide a electronic device comprising a first watch module including: a first body, a watch movement located in the first body, a first window connected to the first body, and a watch hand located between the watch movement and the first window, connected to the watch movement and receiving driving power from the watch movement; and a second watch module including: a second body extended from the first body, a circuit board located in at least one of the first body and the second body, a second window connected to the second body, a second display located between the circuit board and the second window, and connected to the circuit board, wherein the first body and the second body form a bending so that a direction which the first window faces outwards is different from a direction which the second window faces outwards, and are communicated to each other.

The first body may include a first upper part at which the first window is located; and a first lower part opposite to the first upper part and forming a part of an outer surface of the first body. The second body may include a second upper part at which the second window is located; and a second lower part opposite to the second upper part and forming a part of an outer surface of the second body.

The second upper part may form an inclination with respect to the second lower part.

The inclination is formed along a direction from the first watch module to the second watch module.

The inclination is formed along a direction perpendicular to another direction from the first watch module to the second watch module.

The electronic device may further comprise a third body communicated to the first body and the second body; a third watch module including a third window through which the first window and the second window are connected. The third body may include a third upper part at which the third window is located; and a third lower part opposite to the third upper part and forming a part of an outer surface of the third body.

The third upper part may connect the first upper part to the second upper part and the third lower part may connect the first lower part to the second lower part.

A radius of curvature of the third lower part may be smaller than a radius of curvature of the third upper part.

The first watch module may include a first power unit which supplies power to the watch movement, and the second watch module may include a second power unit which supplies power to the circuit board, and is charged by receiving power from outside.

The electronic device may further comprise a controller which is connected the first power unit and the second power unit, wherein the controller may be configured to supply power to the second power unit from the first power unit in accordance to an input obtained from the second display.

The first watch module may include a first display located between the first window and the watch hand, and a controller which is connected to the first power unit and the second power unit, and wherein the controller is configured to supply power to the second power unit from the first power unit in accordance to an input obtained from the first display.

The electronic device may further comprise a controller which is connected the first power unit and the second power unit, wherein the controller is configured to charge the first power unit from at least one of the second power unit and the external power source when the second power unit is charged from an external power source.

The first window may be formed integrally with the second window. The first watch module may include a first display located between the first window and the watch hand. The first display may be one of display states including: a first display state in which the watch hand is projected through the first window and information is displayed on the first display, a second display state in which the watch hand is projected through the first window but information is not displayed on the first display, and a third display state in which the watch hand is not projected through the first window and information is displayed on the first display.

The first window may include a first touch sensor which obtains a touch input, and wherein the electronic device further includes a controller which receives an input obtained from the first touch sensor and process the input.

The first touch sensor may include a first fingerprint sensor which obtains a user's fingerprint information.

According to at least one of some embodiments of the present invention, the present invention can provide independent function of an analog watch in a smart watch.

According to at least one of some embodiments of the present invention, the present invention can provide independent function of a smart watch in an analog watch.

According to at least one of some embodiments of the present invention, the present invention can provide a complementary effect of the analog watch and the smart watch.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
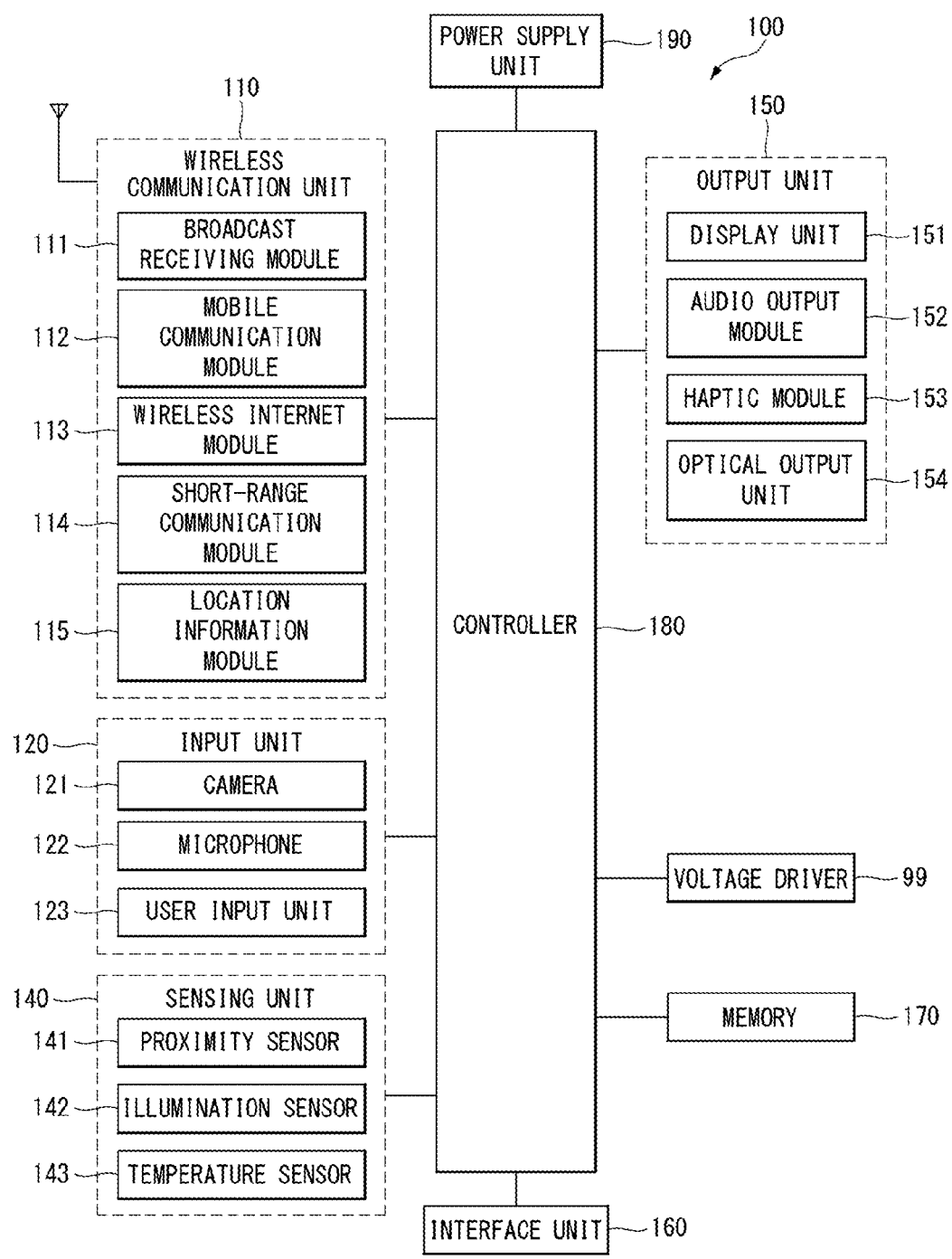
FIG. 1 is a block diagram for illustrating an electronic device associated with certain embodiments of the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Electronic devices disclosed herein may include mobile phones, smart phones, laptop computers, digital broadcasting terminals, personal digital assistants (PDAs), portable multimedia players (PMPs), navigators, slate PCs, tablet PCs, ultra books, and wearable devices, for example, smart watches, smart glasses, head mounted displays (HMDs), and the like.

However, configuration according to an embodiment of the present invention may be applied to stationary terminals such as digital TV, desktop computers, digital signage, and the like except a case of being applied to only electronic devices.

FIG. 1 is a block diagram for illustrating an electronic device associated with certain embodiments of the present invention.

The electronic device 100 may include a voltage driver 99, a wireless communication unit 110, an input unit 120, a sensing unit 140, an output unit 150, an interface unit 160, a memory 170, a controller 180 and a power supply unit 190. The components shown in FIG. 1 are not essential in implementing the electronic device, thus, the electronic device described herein may include greater components than the components listed above, or may include fewer components.

More specifically, the voltage driver 99 in the above components may control a voltage applied to an electrode 700 to be described later. The voltage driver 99 may generate various voltages applied to the electrode 700. Generation of the various voltages of the voltage driver 99 may be controlled by the controller 180 to be described later.

The wireless communication unit 110 may include one or more modules that enable wireless communication between the electronic device 100 and a wireless communication system, between the electronic device 100 and other electronic devices 100, or between the electronic device 100 and an external server. Further, the wireless communication unit 110 may include one or more modules that connect the electronic device 100 to one or more networks.

The wireless communication unit 110 may include at least one of a broadcast receiving module 111, a mobile communication module 112, a wireless Internet module 113, a short-range communication module 114, and a location information module 115.

The input part 120 may include a camera 121 or a video input for inputting video signal, a microphone 122 or an audio input for inputting audio signal, a user input unit 123 (for example, a touch key, a mechanical key, and the like) for inputting information from a user. Voice data or image data collected by the input unit 120 may be analyzed and be processed by a control command of the user.

The sensing unit 140 may include at least one sensor for sensing at least one of information within an electronic device, environment information surrounding the electronic device and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, a camera 121), a microphone 122, a battery gauge, an environmental sensor (for example, a barometer, a hygrometer, a thermometer, a radiation sensor, a thermal sensor, a gas sensor, and the like), a chemical sensor (for example, an electronic nose, a healthcare sensor, a biometric sensor, and the like). Meanwhile, the electronic device disclosed herein may combine information sensed in the at least two sensors of these sensors, the electronic device disclosed herein and then utilize the information. In particular, in some embodiments of the present invention, the environmental sensor may include a temperature sensor 143.

The output unit 150 is typically configured to output various types of information, such as audio, video, tactile output, and the like. The output unit 150 may include at least one of a display unit 151, an audio output unit 152, a haptic module 153, and an optical output unit 154. The display unit 151 may implement a touch screen by having an interlayered structure or an integrated structure with a touch sensor. The touch screen may provide an output interface between the electronic device 100 and a user, as well as function as the user input unit 123 which provides an input interface between the electronic device 100 and the user.

The interface unit 160 may serve as an interface with a variety of external devices connected to the electronic device 100. The interface unit 160 may include at least one of a wire/wireless headset port, an external charger port, a wire/wireless data port, a memory card port, a port connecting a device equipped with an identification module, an audio input/output (I/O) port, a video I/O port, and an earphone port. The electronic device 100 may perform an appropriate control associated with a connected external device, in response to the external device being connected to the interface unit 160.

In addition, the memory 170 stores data that supports various functions of the electronic device 100. The memory 170 may store a plurality of application programs or applications, which is executed in the electronic device 100, and data or commands for operations of the electronic device 100. At least some of these application programs may be downloaded from an external server through wireless communication. In addition, at least some of these application programs may be installed on the electronic device 100 at time of manufacturing or shipping, for basic functions (for example, receiving a call, placing a call, receiving a message, sending a message, and the like) of the electronic device 100. The application program may be stored in the memory 170, installed on the electronic device 100, and executed by the controller 180 to perform operation (or function) for the electronic device.

The controller 180 may typically control overall operations of the electronic device 100, in addition to the operations associated with the application program. The controller 180 may provide or process information or function appropriate for the user by processing input or output signal, data, information, and the like, or by executing the application program stored in the memory 170 through the components described above. The controller 180 may control at least some of the components of FIG. 1 in order to execute the application program stored in the memory 170. Further, the controller 180 may operate in combination with each other at least two of the components included in the electronic device 100 for executing of the application program.

The power supply unit 190 may be configured to receive external power and internal power and supply the power to each of the components included in the electronic device 100 under the control of the controller 180. The power supply unit 190 may include a battery, which may be an embedded battery or a detachable battery.

At least some of each of the components may operate in cooperation with each other in order to implement an operation, a control, or a control method of the electronic device according to various embodiments that is described below. In addition, the operation, the control, or the control method of the electronic device may be implemented on the electronic device by the execution of the at least one application program stored in the memory 170.

Hereinafter, prior to discussing the various embodiments implemented through the electronic device 100 described above, referring still to FIG. 1, various components depicted in this figure are described in more detail.

Regarding the wireless communication unit 110, the broadcast receiving module 111 of the wireless communication unit 110 is configured to receive a broadcast signal and/or broadcast associated information from an external broadcast managing server via a broadcast channel. The broadcast channel may include a satellite channel, a terrestrial channel, or both. In some embodiments, two or more broadcast receiving modules 111 may be provided for the electronic device 100 to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), Long Term Evolution-Advanced (LTE-A), and the like).

The wireless signals may include audio call signals, video (telephony) call signals, or various formats of data according to transmitting and/or receiving of text and multimedia messages.

The wireless Internet module 113 is configured to facilitate wireless Internet access. This module may be internally or externally coupled to the electronic device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, wireless communications between the electronic device 100 and another electronic device 100, or wireless communications between the electronic device 100 and a network where another electronic device 100 (or an external server) is located, via Wireless Area Networks. One example of the Wireless Area Networks is a Wireless Personal Area Networks.

In some embodiments, another electronic device 100 may be a wearable device, for example, a smart watch, a smart glass or a head mounted display (HMD), which is able to exchange data with the electronic device 100 according to the present invention (or otherwise cooperate with the electronic device 100). The short-range communication module 114 may sense or recognize the wearable device, and permit communication between the electronic device 100 and the wearable device surrounding the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can confirm the received message using the wearable device.

The location information module 115 is generally configured to identify a location (or a current location) of the electronic device. As an example, the location information module 115 includes a Global Location System (GPS) module, a Wireless Fidelity (Wi-Fi) module, or both. As one example, when the electronic device uses a GPS module, a location of the electronic device may be acquired using a signal sent from a GPS satellite. As another example, when the electronic device uses the Wi-Fi module, a location of the electronic device can be acquired based on information related to a wireless access point (AP) which transmits or receives a wireless signal to or from the Wi-Fi module. If necessary, the location information module 115 may perform any function of the other modules of the wireless communication unit 110 to obtain the data about the location of the electronic device in substitution or in addition. The location information module 115 may be a module used to obtain the location (or the current location) of the electronic device, but is not limited to a module that directly calculate or obtain the location of the electronic device.

The input unit 120 may be a unit for an input of image information (or signal), audio information (or signals), data, or user input information. The electronic device 100 may be provided with one or a plurality of cameras 121 for an input of image information. Such cameras 121 may process image frames of still pictures or video obtained by image sensors in a video call mode or a photographing mode. The processed image frames can be displayed on the display unit 151 or stored in the memory 170. Meanwhile, the plurality of cameras 121 of the electronic device 100 may be arranged in a matrix configuration to permit a plurality of images having various angles or focal points to be input to the electronic device 100. As another example, the plurality of cameras 121 may be located in a stereoscopic arrangement to acquire left and right images for implementing a stereoscopic image.

The microphone 122 may process external sound signals into electrical voice data. The processed voice data may be utilized in various manners according to a function (or executing application) being executed in the electronic device 100. On the other hand, the microphone 122 may include assorted noise removing algorithms to remove unwanted noise generated in the course of receiving the external sound signals.

The user input unit 123 is a component that permits input by a user. Such user input may enable the controller 180 to control operation of the electronic device 100. The user input unit 123 may include a mechanical input element (for example, a mechanical key, a button located on a front and/or rear surface or a side surface of the electronic device 100, a dome switch, a jog wheel, a jog switch, and the like), and a touch-sensitive input. As one example, the touch-sensitive input may be a virtual key, a soft key, or a visual key, which is displayed on a touch screen through software processing, or a touch key which is located at a location that is other than the touch screen. On the other hand, the virtual key or the visual key may be displayed on the touch screen in various shapes, for example, graphic, text, icon, video, or a combination thereof.

The sensing unit 140 may be generally configured to sense at least one of internal information of the electronic device, surrounding environment information of the electronic device, and user information, and generate a sensing signal corresponding thereto. The controller 180 may be configured to control driving or operation of the electronic device 100 or execute data processing, a function or an operation associated with an application program installed in the electronic device based on the sensing provided by the sensing unit 140. The sensing unit 140 may include a variety of sensors, some of which will now be described in more detail.

The proximity sensor 141 may refer to a sensor to sense presence or absence of an object approaching a surface, or an object located near a surface, by using an electromagnetic field, infrared rays, or the like without a mechanical contact. The proximity sensor 141 may be arranged at an inner region of the electronic device covered by the touch screen described above, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (or touch sensor) may also be categorized as a proximity sensor.

The term "proximity touch" will often be referred to herein to denote the scenario in which a pointer is located to be proximate to the touch screen without contacting the touch screen. The term "contact touch" will often be referred to herein to denote the scenario in which a pointer makes physical contact with the touch screen. For the location corresponding to the proximity touch of the pointer relative to the touch screen, such location will correspond to a location where the pointer is perpendicular to the touch screen. The proximity sensor 141 may sense proximity touch, and proximity touch patterns (for example, distance, direction, speed, time, location, moving status, and the like). Meanwhile, the controller 180 may process data (or information) corresponding to proximity touches and proximity touch patterns sensed by the proximity sensor 141, and output visual information corresponding to the processed data on the touch screen. In addition, the controller 180 can control the electronic device 100 to execute different operations or process different data according to whether a touch with respect to a point on the touch screen is either a proximity touch or a contact touch.

A touch sensor may sense a touch (or touch input) applied to the touch screen (or the display unit 151) using at least one of a variety of touch methods, such as a resistive type, a capacitive type, an infrared type, an ultrasonic wave type and a magnetic field type, and the like.

As one example, the touch sensor may be configured to convert changes of pressure applied to a specific part of the touch screen, or capacitance occurring at a specific part of the touch screen, into electric input signals. The touch sensor may also be configured to sense a touched location, a touched area, touch pressure and touch capacitance, and the like. A touch object is generally used to apply a touch input on touch screen to the touch sensor. Here, the touch object is an object for applying a touch to the touch sensor. For example, the touch object may include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, or the controller 180.

The controller 180 may execute the same or different controls according to a type of touch object that touches the touch screen or a touch key provided in addition to the touch screen. Whether to execute the same or different control according to the type of the touch object may be decided based on a current operating state of the electronic device 100 or a currently executed application program.

The touch sensor and the proximity sensor may be implemented individually, or in combination, to sense various types of touches. Such touches may include a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize location information relating to a touch object using ultrasonic waves. The controller 180 may calculate a location of a wave generation source based on information sensed by an optical sensor and a plurality of ultrasonic sensors. Since light is much faster than ultrasonic waves, the time for which the light reaches the optical sensor is much shorter than the time for which the ultrasonic wave reaches the ultrasonic sensor. The location of the wave generation source may be calculated using this fact. For instance, the location of the wave generation source may be calculated using the time difference from the time that the ultrasonic wave reaches the sensor based on the light as a reference signal.

The camera 121, seen in the configuration of the input unit 120, may include at least one of a camera sensor (for example, CCD, CMOS etc.), a photo sensor (or an image sensor), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light, and thus obtain location information of the physical object.

The display unit 151 may display information processed in the electronic device 100. For example, the display unit 151 may display execution screen information of the application program executed on the electronic device 100, or User Interface (UI) information, Graphic User Interface (GUI) information according to the execution screen information.

The display unit 151 may be implemented as a stereoscopic display unit for displaying stereoscopic images.

The typical stereoscopic display unit may employ a stereoscopic display scheme such as a stereoscopic scheme (a glass scheme), an auto-stereoscopic scheme (glassless scheme), a projection scheme (holographic scheme), or the like.

The audio output unit 152 may be configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output unit 152 may output audio signals related to a particular function (for example, a call signal reception sound, a message reception sound, etc.) performed by the electronic device 100. The audio output unit 152 may also be implemented as a receiver, a speaker, a buzzer, or the like.

The haptic module 153 may be configured to generate various tactile effects that a user can feel. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, an electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the electronic device 100.

The optical output unit 154 may output a signal for indicating an event generation by using light of a light source of the electronic device 100. Examples of events generated in the electronic device 100 may include a message reception, a call signal reception, a missed call, an alarm, a schedule notice, an email reception, an information reception through an application, and the like.

A signal output by the optical output unit 154 may be implemented in such a manner that the electronic device emits in front or back monochromatic light or light with a plurality of colors. The signal output may be terminated as the electronic device senses that a user has checked the generated event.

The interface unit 160 serves as an interface for external devices to be connected with the electronic device 100. The interface unit 160 can receive data transmitted from an external device, receive power to transfer to elements and components within the electronic device 100, or transmit internal data of the electronic device 100 to such external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating an authority for using the electronic device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the electronic device 100 via the interface unit 160.

When the electronic device 100 is connected with an external cradle, the interface unit 160 can serve as a passage to allow power from the cradle to be supplied to the electronic device 100 or may serve as a passage to allow various command signals input by the user from the cradle to be transferred to the electronic device 100. Various command signals or power input from the cradle may operate as signals for recognizing that the electronic device 100 is properly mounted on the cradle.

The memory 170 can store programs to support operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The electronic device 100 may also be operated in relation to a web storage that performs the storage function of the memory 170 on the Internet.

On the other hand, as previously discussed, the controller 180 may control the operations of associated with the application and the general operations of the electronic device 100. For example, when a status of the electronic device meets a preset condition, the controller 180 may execute or release a lock state for restricting a user from inputting a control command with respect to applications.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components discussed above in order to implement various embodiments described below on the electronic device 100 according to the present invention.

The power supply unit 190 may receive external power or internal power and supply the appropriate power required for operating respective elements under the control of the controller 180. The power supply unit 190 may include a battery, which may be a built-in battery to be charged or be detachably coupled to the device body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power using at least one of an inductive coupling method which is based on magnetic induction or a magnetic resonance coupling method which is based on electromagnetic resonance from an external wireless power transmitter.

On the other hand, various embodiments described below may be implemented in a computer-readable medium, or similar medium using, for example, software, hardware, or any combination thereof.

Meanwhile, the electronic device may be configured as a device which is wearable on a human body. Such devices go beyond the usual technique of grasping the electronic device using their hand. Examples of the wearable device may include a smart watch, a smart glass, a head mounted display (HMD), and the like. It will be described below in examples of an extended electronic device as a wearable device.

A typical wearable device can exchange data with (or cooperate with) another electronic device 100. The short-range communication module 114 may sense or recognize a wearable device that is near-enough to communicate with the electronic device. In addition, when the sensed wearable device is a device which is authenticated to communicate with the electronic device 100, the controller 180 may transmit at least some of data processed in the electronic device 100 to the wearable device via the short-range communication module 114. Hence, a user of the wearable device can use the data processed in the electronic device 100 on the wearable device. For example, when a call is received in the electronic device 100, the user can answer the call using the wearable device. Also, when a message is received in the electronic device 100, the user can check the received message using the wearable device.

At least some of the each component may operate in cooperation with each other in order to implement an operation, a control, or a control method of the electronic device 100 in accordance with various embodiments described below. In addition, the operation, the control, or the control method of the electronic device 100 may be implemented by a drive of at least one application stored in the memory 170.

Figure 2:
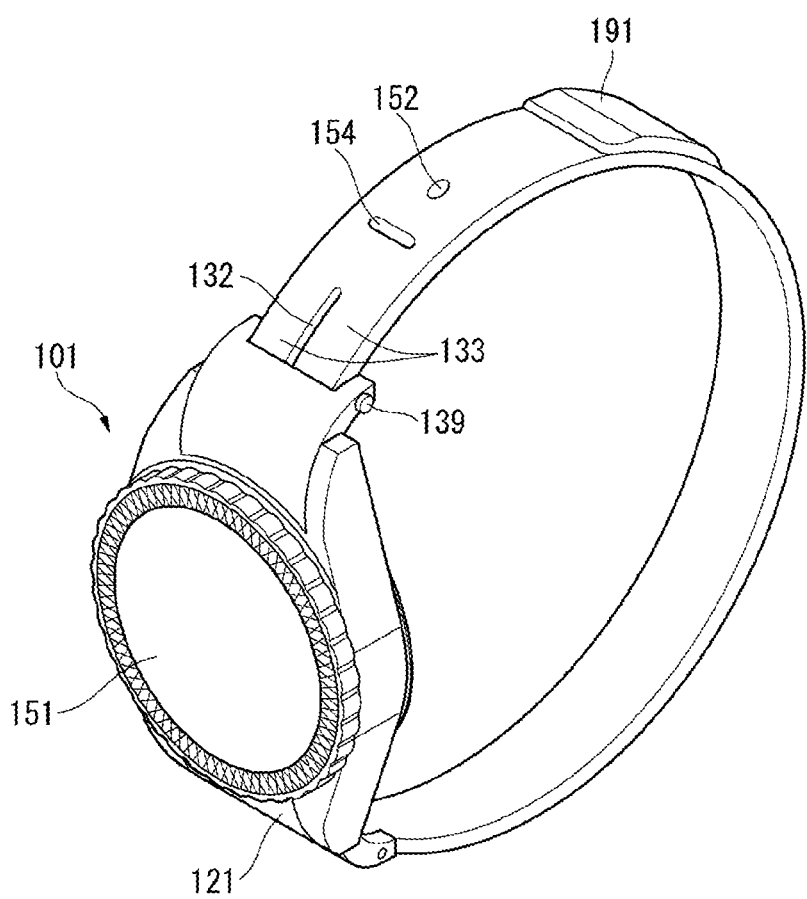
FIG. 2 is a perspective diagram of an electronic device associated with certain embodiments of the present invention.
Figure 3:
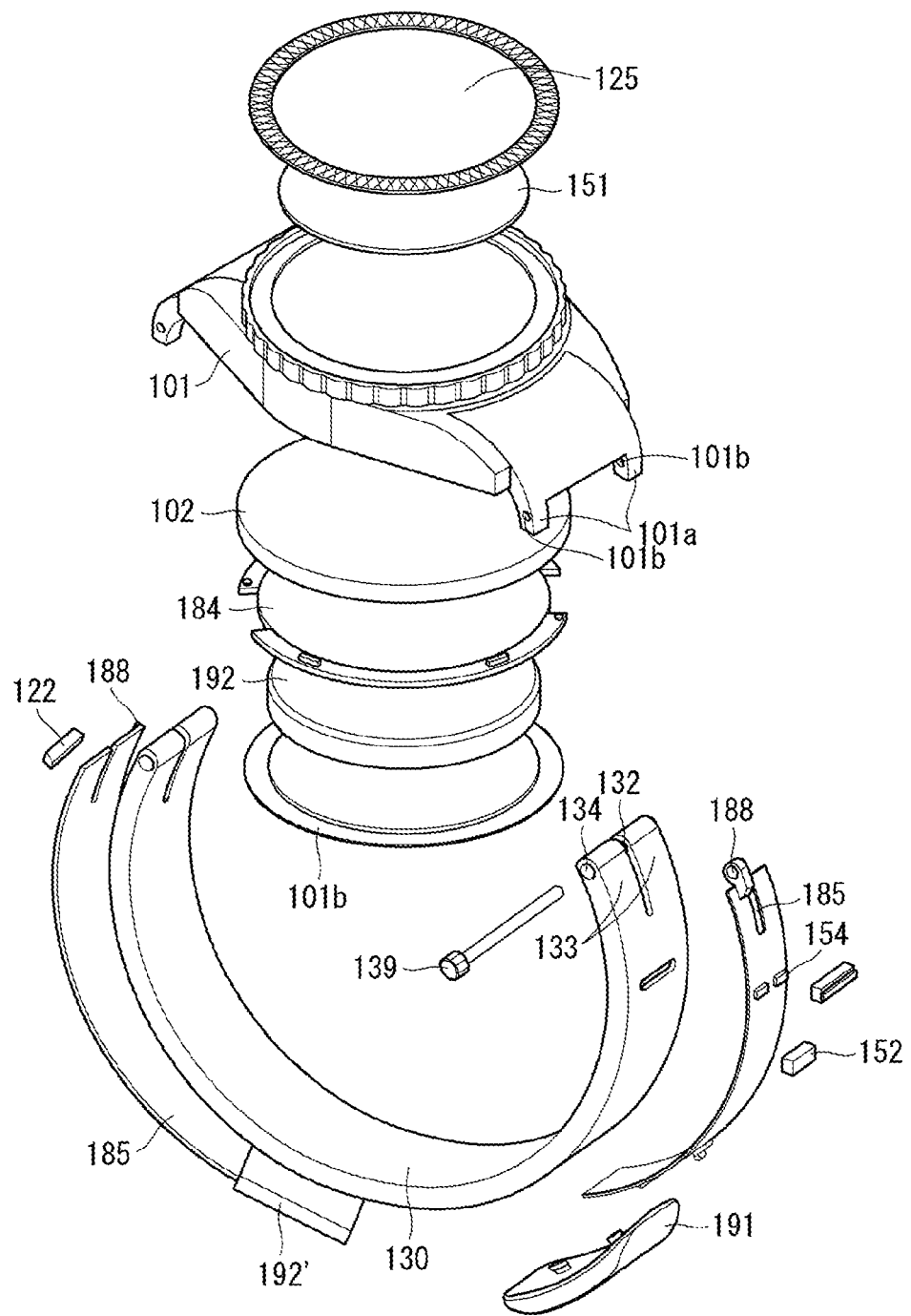
FIG. 3 is an exploded perspective diagram of the electronic device of FIG. 2.

A watch type of electronic device 100 of the present invention may be a mobile terminal worn on the user's wrist by winding as a type of the mobile terminal. The watch type of electronic device 100 may include some or all of the configurations described above. It will be described below with reference to the drawings for the features related to the shape of the watch type of electronic device 100. FIG. 2 is a perspective diagram of the electronic device associated with certain embodiments of the present invention. FIG. 3 is an exploded perspective diagram of the electronic device of FIG. 2.

The electronic device of the present invention may include a band unit 130 including a curved surface in the longitudinal direction or a flexible material, and may be detachable with a main body unit 101 by a hinge pin 139.

The band unit 130 may be formed into a curved surface shape with a rigid material, or be bendable with a flexible material. The band unit 130 may be worn on the user's wrist with being wound. An inside of the band unit 130 may be provided with a length in which the electronic component is to be mounted. In the length may be mounted a band substrate 185, the audio output unit 152, the microphone 122, and the optical output unit 154 and an antenna (not shown).

Figure 4:
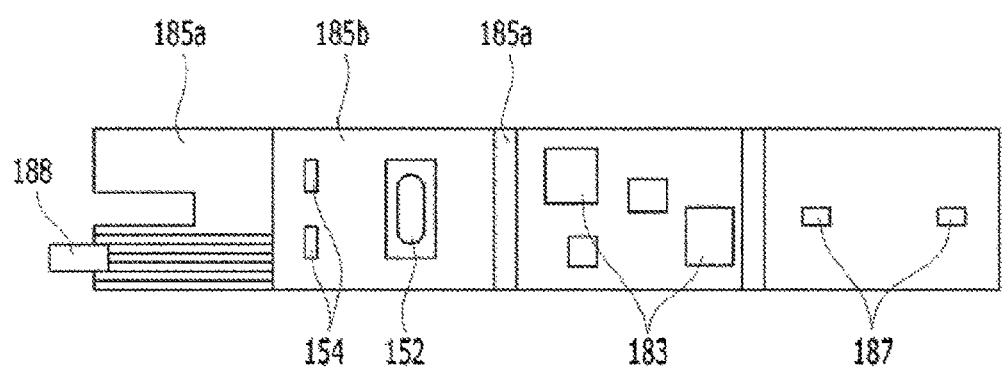
FIGS. 4 and 5 are plan diagrams for illustrating a band substrate of an electronic device associated with certain embodiments of the present invention.
Figure 5:
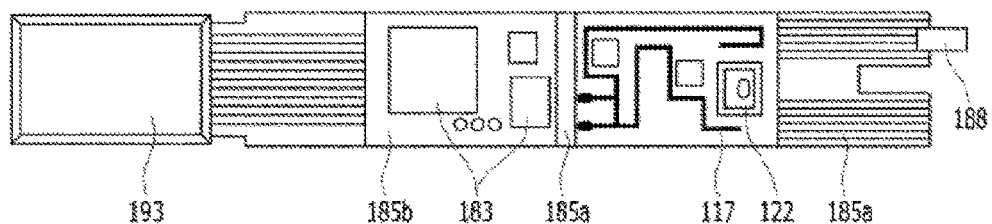

FIGS. 4 and 5 are plan diagrams for illustrating a band substrate of the electronic device associated with certain embodiments of the present invention. The band substrate 185 may include a bendable flexible substrate. As shown in FIGS. 4 and 5, the substrate of the rigid material may consist of a plurality of pieces. The flexible substrate may be interposed therebetween. The band substrate 185 can be made of a flexible material as a whole.

In the band substrate may be mounted IC 183 that controls the audio output unit 152, the microphone 122, the optical output unit 154 and the wireless communication unit 183 that are mounted on the band unit 130. The IC 183 may also control the main body unit 101 in a case of being connected to the main body unit 101. The audio output unit 152, the microphone 122, the optical output unit 154 and the antenna 117 and the like may be mounted on the band unit 130 separately from the band substrate 185, as shown in FIGS. 4 and 5, however, be mounted on the band substrate 185.

As shown in FIG. 3, the band substrate 185 which is located on one side and the other side of the band unit 130 may be separated, or may be a single of the band substrate 185 by being connected to both ends. Even if they are separated, when the end of the band unit 130 is connected to the main body unit 101, or the ends of the band unit 130 are connected to each other, the separate band substrate 185 can be connected.

On one side of the band substrate 185 may be located the audio output unit 152, the optical output unit 154, the IC 183, and a terminal for connecting with the external battery 191. On the other side of the band substrate 185 may be mounted the microphone 122, the antenna 117, the IC 183 and the built-in battery 193. The arrangement can be change, in addition to the above configuration, there are more components to be mounted.

A slit 132 extended in the longitudinal direction of the band unit 130 is located at the end of the band unit 130. In this embodiment, the slit 132 is formed one by one on both ends of the band unit 130. Both ends of the band unit 130 by the slits 132 are divided into two divided end 133. The number of the divided end 133 is also increased when the number of the slits 132 is a plural number.

The divided end 133 may be made of a flexible material even if the band unit 130 is made of a rigid material. The divided end 133 may be bent up and down in the thickness direction of the band unit 130. The divided end 133 defined by the slit 132 may be bent in different directions, respectively.

The end of the band unit 130 further may include a fastening hole 134 which extends in a width direction in a side surface of the divided end 133. The hinge pin 139 may be fastened to the fastening hole 134 for fastening the main body unit 101. The body unit 101 may include a hinge hole 101*b* which the hinge pin 139 transpierce.

The hinge pin 139 that transpierce the band unit 130 may be made of a conductive material, and electrically connected to a connection ring 188 that is located inside the fastening hole 134 and the hinge hole 101*b*. The connection ring 188 is a ring-shaped member, which is made of a conductive material, provided on the inner side of the fastening hole 134 of the band unit 130. An end of the connection ring 188 can be coupled with the band substrate 185 mounted on the band unit 130.

The main body unit 101 provides a clock face 102 including a time scale and an hour hand and a second hand pointing to the time scale to the front. The main body unit 101 may include a band fastening unit 101*a* that is coupled through the band unit 130 and the hinge pin 139 on both sides. The band fastening unit 101*a* may be composed of a pair of band unit fastening projection that are spaced at an interval corresponding to a width of the band unit 130 and the hinge hole 101*b* that is formed in the band unit fastening projection. As described above, the hinge pin 139 is inserted in the hinge hole 101*b*, thus the main body unit 101 may be fastened with the band unit 130.

The main body unit 101 may be a watch body having only the function of a normal wristwatch. The normal wristwatch also may be provided with the band fastening unit 101*a* for replacing a watch strap. The band unit 130 can be replaced using the hinge pin 139 in the hinge hole 101*b* of the band fastening unit 101*a*. The electronic device of the present invention can be fastened to a conventional main body unit 101.

The main body unit 101 on which separate electronic components are not mounted may include a battery 192 for the driving of the clock face 102. The battery 192 may be used only for driving of the clock face 102. When the electronic components in the band unit 130 are driven and the display unit 151 is coupled additionally, the display unit 151 can be driven by using a battery provided in the band unit 130.

Alternatively, as shown in FIG. 3, the display unit 151 can be driven by using the main body unit 101 on which the electronic component is mounted. The main body unit 101 may be provided with the display unit 151, a circuitry 184 for control, and the battery 192 for supplying power. As shown in FIG. 3, configuration such as the camera 121 that is not provided in the electronic device may be provided in the main body unit 101.

The display unit 151 may keep transparent state when it may be used as a normal clock. The display unit 151 may be changed in non-transparent/translucent state only when information is output through the display unit 151. The display unit 151 can perform at the same time an input and an output by further including a touch sensor 125 on the front of the display unit 151.

Thus, when the electronic components are mounted on the main body unit 101, the connection ring 188 is provided in the hinge hole 101*b* for electrical connection with the electronic components. The electronic components can be connected with the circuit 184 within the main body unit 101 through the connection ring 188. Function can be extended by connection of the main body unit 101 and the band unit 130.

For example, when the main body unit 101 is provided with only the display function, by connecting the main body unit 101 with the band unit 130, calls or data transmission and reception is possible through wireless communication with a base station or short-range communication using the antenna 117 provided in the band unit 130. Output with sound information is also possible through the audio output unit 152 provided in the band unit 130.

In addition to connecting the main body unit 101 with the end of the band unit 130, the main body unit 101 may be provide with power in connection with an external power through the hinge pin 139, or the main body unit 101 may be used in connection with an external terminal such as a computer.

As described above through FIG. 1, the electronic device in according to the present invention can apply the short-range communication technologies such as Bluetooth™, Radio Frequency Identification (RFID), Infrared Data Association (IrDA), Ultra Wideband (UWB), ZigBee, Near Field Communication (NFC), Wireless Universal Serial Bus (Wireless USB), etc.

Among them, the NFC module provided in the electronic device may support the non-contact short-range communication between terminals at a shorter or longer distance than 10 cm. The NFC module may be operable by any one of the card mode, the reader mode and the P2P mode. In order that the NFC module operates in the card mode, the electronic device 100 may further comprise a security module for storing card information. Here, the security module may be Universal Integrated Circuit Card (UICC) (for example, Subscriber Identification Module (SIM) or Universal SIM (USIM)), Secure micro SD and a physical media such as stickers, and the like, or a logical media which is embedded in the electronic device (for example, embedded Secure Element (SE)). The data exchange may be made based on the Single Wire Protocol (SWP) between the NFC module and the security module.

When the NFC module operates in the card mode, the electronic device can pass card information which is stored like a conventional IC card to the outside. Specifically, the electronic device which stores card information for payment, such as a credit card or a bus card is close to a rate payment device, a short-range mobile payment can be processed. When the electronic device which stores information of an access card is close to an access authorization device, approval process can be started out. Cards, such as a credit card, a traffic card and an access card are mounted in the secure module as an applet form. The security module may store card information on the mounted card. Here, the card information for the payment card may be at least one of a card number, balance, and history. The card information of the access card may be at least one of the user's name, number (for example, the user's student ID number or employee ID number), access history.

When the NFC module operates in the reader mode, the electronic device can read out data from an external tag. At this time, data which the electronic device receives from the tag may be coded in an NFC Data Exchange Format which is determined in the NFC Forum. In addition, the NFC forum defines four record types. Specifically, the NFC forum defines four record type definitions (RTD), such as smart poster, text, uniform resource identifier (URI), and general control, and the like. When received data from the tag is a smart poster type, the controller 180 may execute a browser (for example, Internet browser). When received data from the tag is a text type, the controller 180 may execute a text viewer. When received data from the tag is an URI type, the controller 180 may execute a browser or make a call. When received data from the tag is a general control type, the controller 180 may execute an appropriate operation according to control information.

When the NFC module operates in the Peer-to-Peer (P2P) mode, the electronic device can perform P2P communication with another electronic device. At this time, a Logical Link Control Protocol (LLCP) can be applied to the P2P communication. Connection between the electronic device and another electronic device may be generated for the P2P communication. At this time, the generated connection can be divided into connectionless mode which exchanges one packet and then ends and connection-oriented mode which continuously exchanges the packet. Through the P2P communication, business cards in electronic form, contact information, digital photos, data such as a URL, and set up parameters for Bluetooth, Wi-Fi connection, and the like may be exchanged. However, because of the short distances available NFC communication, the P2P mode may be effectively utilized for exchange of a small size of data.

Hereinafter, embodiments related to control method which may be implemented in the electronic device configured as above are described with reference to the accompanying drawings. It is apparent to those skilled in the art that various modifications can be made to the invention without departing from the spirit and essential features of the present invention.

Figure 6:
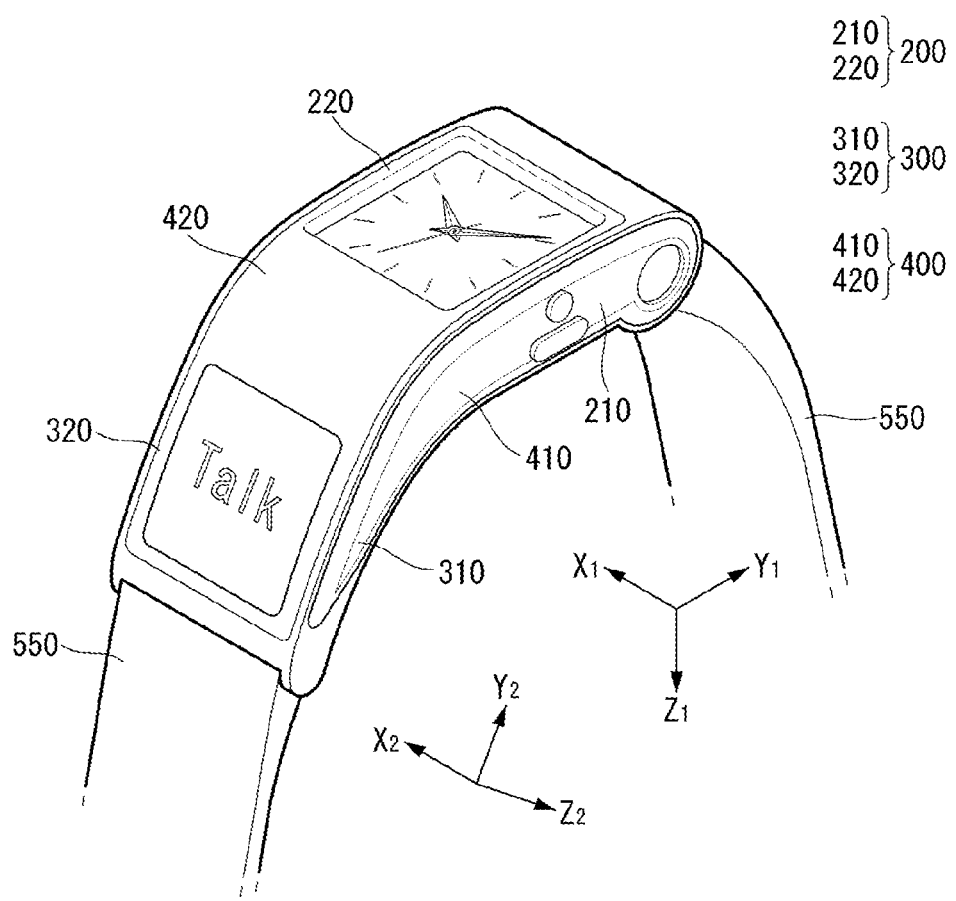
FIG. 6 is a perspective diagram of an electronic device according to an embodiment of the present invention.

FIG. 6 is a perspective diagram of an electronic device according to an embodiment of the present invention. The electronic device according to an embodiment of the present invention may include a first watch module 200 and a second watch module 300, as shown in FIG. 6.

The first watch module 200 may include a first body 210 and a first window 220. The first watch module 200 may basically function as an analog watch. The first watch module 200 may operate for a considerable time without charging of electric power from the outside. Here, the considerable time can be a battery exchange cycle when using a clock generally. In addition, operation of the first watch module 200 can basically display time and additionally display date and day of week, etc.

The first window 220 may be located on an upper part of the first body 210. Here, $X_1Y_1Z_1$ coordinate system can be set based on the first window 220. The $X_1Y_1Z_1$ coordinate system may be subject to right handed direction as the Cartesian coordinate system. That is, when the four fingers from an index finger to a little finger on the right hand grip from $X_1$ to $Y_1$, a direction to which a thumb is pointing can be $Z_1$ direction. The first window 220 may be located on $X_1Y_1$ plane. The $Z_1$ direction may be a depth direction of the first body 210. The $Z_1$ direction may face a lower part of the first body 210 as going toward a positive direction of the $Z_1$-axis.

The second watch module 300 may include a second body 310 and a second window 320. The second watch module 300 may basically provide function of a smart watch. The second watch module 300 may be provided with a display and can perform networking function. The networking function may include communicating with the peripheral device, as well as a direct communication with a base station. The second watch module 300 may perform a variety of functions, including a sensor, and may be provided with a processor.

The second body 310 may be connected to the first body 210. The second body 310 and the first body 210 may form a bending by connecting. In other words, a curved shape or a folded shape may be formed in portion to which the second body 310 and the first body 210 are connected. In addition, an interior of the second body 310 and an interior of the first body 210 may be communicated. The second body 310 may be connected to the first body 210 through a third body 410.

The second window 320 may be located on the upper part of the second body 310. $X_2Y_2Z_2$ coordinate system may be set based on the second window 320. The $X_2Y_2Z_2$ coordinate system may be subject to right handed direction as the Cartesian coordinate system. That is, when the four fingers from an index finger to a little finger on the right hand grip from $X_2$ to $Y_2$, a direction to which a thumb is pointing can be $Z_2$ direction. The second window 320 may be located on $X_2Y_2$ plane. The $Z_2$ direction may be a depth direction of the second body 310. The $Z_2$ direction may face a lower part of the second body 310 as going toward a positive direction of the $Z_2$-axis. The second window 320 may be connected to the first window 220. The second window 320 may be connected to the first window 220 through a third window 420. The second window 320 may be formed integrally with the first window 220. The second window 320 may be integrally formed with the first window 220 and the third window 420.

The electronic device according to an embodiment of the present invention may include a third watch module 400. The third watch module 400 may include a third body 410 and a third window 420. The third watch module 400 may connect the first watch module 200 to the second watch module 300. When the third watch module 400 connects the first watch module 200 to the second watch module 300, the third watch module 400 may form a bending of the first watch module 200 and the second watch module 300. That is, the third watch module 400 may connect the first watch module 200 to the second watch module 300, however, make the $X_1Y_1$ plane intersect with the $X_2Y_2$ plane.

Positions of the second watch module 300 and the third watch module 400 may be specified based on the first window 220. The first window 220 may be located on the $X_1Y_1$ plane in the $X_1Y_1Z_1$ coordinate system. The second watch module 300 may be located on the negative $Y_1$-axis direction and the positive $Z_1$-axis direction with respect to the first window 220. Thus, the first watch module 200 and the second watch module 300 may be connected to each other but bent.

The third watch module 400 can connect the first watch module 200 to the second watch module 300. Thus, the third watch module 400 may be located on the negative $Y_1$-axis direction with respect to the first window 220. The third watch module 400 may be located on the positive $Z_1$-axis direction or the negative $Z_1$-axis direction with respect to the first window 220.

Positions of the first watch module 200 and the second watch module 300 may be specified based on the second window 320. The second window 320 may be located on the $X_2Y_2$ plane in the $X_2Y_2Z_2$ coordinate system. The first watch module 200 may be located on the positive $Y_2$-axis direction and the positive $Z_2$-axis direction with respect to the second window 320. Thus, the second watch module 300 and the first watch module 200 may be connected to each other but bent.

The third watch module 400 can connect the first watch module 200 to the second watch module 300. Thus, the third watch module 400 may be located on the positive $Y_2$-axis direction with respect to the second window 320. The third watch module 400 may be located on the positive $Z_2$-axis direction or the negative $Z_2$-axis direction with respect to the second window 320. That is, the third watch module 400 may be projected in the negative $Z_2$-axis direction.

Looking at the relationship between the first window 220 and the second window 320, the second window 320 may be located on the $X_2Y_2$ plane, and the first window 220 may be located on the $X_1Y_1$ plane. Therefore, the second window 320 may be located on the negative $Y_1$-axis direction and the positive $Z_1$-axis direction with respect to the first window 220 in the $X_1Y_1Z_1$ coordinate system.

An extension direction of the second window 320 may be the negative $Y_1$-axis direction and the positive $Z_1$-axis direction from the first window 220 in the $X_1Y_1Z_1$ coordinate system. Therefore, a direction which the second window 320 faces outwards may form an angle with a direction which the first window 220 faces outwards. The direction which the first window 220 faces outwards may be the negative $Z_1$-axis direction. The direction which the second window 320 faces outwards may be the negative $Z_2$-axis direction. In other words, the negative $Z_1$-axis direction may form an angle with the negative $Z_2$-axis direction.

The electronic device according to an embodiment of the present invention may be worn on part of a user's body. For example, the electronic device may be worn on the user's wrist. Since the $Z_1$-axis direction forms an angle with respect to the $Z_2$-axis direction, the user can look at the second window 320 without rotating the user's wrist or moving the user's body. Since the second watch module 300 can provide the functions of the smart watch, the user can look easily at the display of the second watch module 300 or perform easily a touch input.

Figure 7:
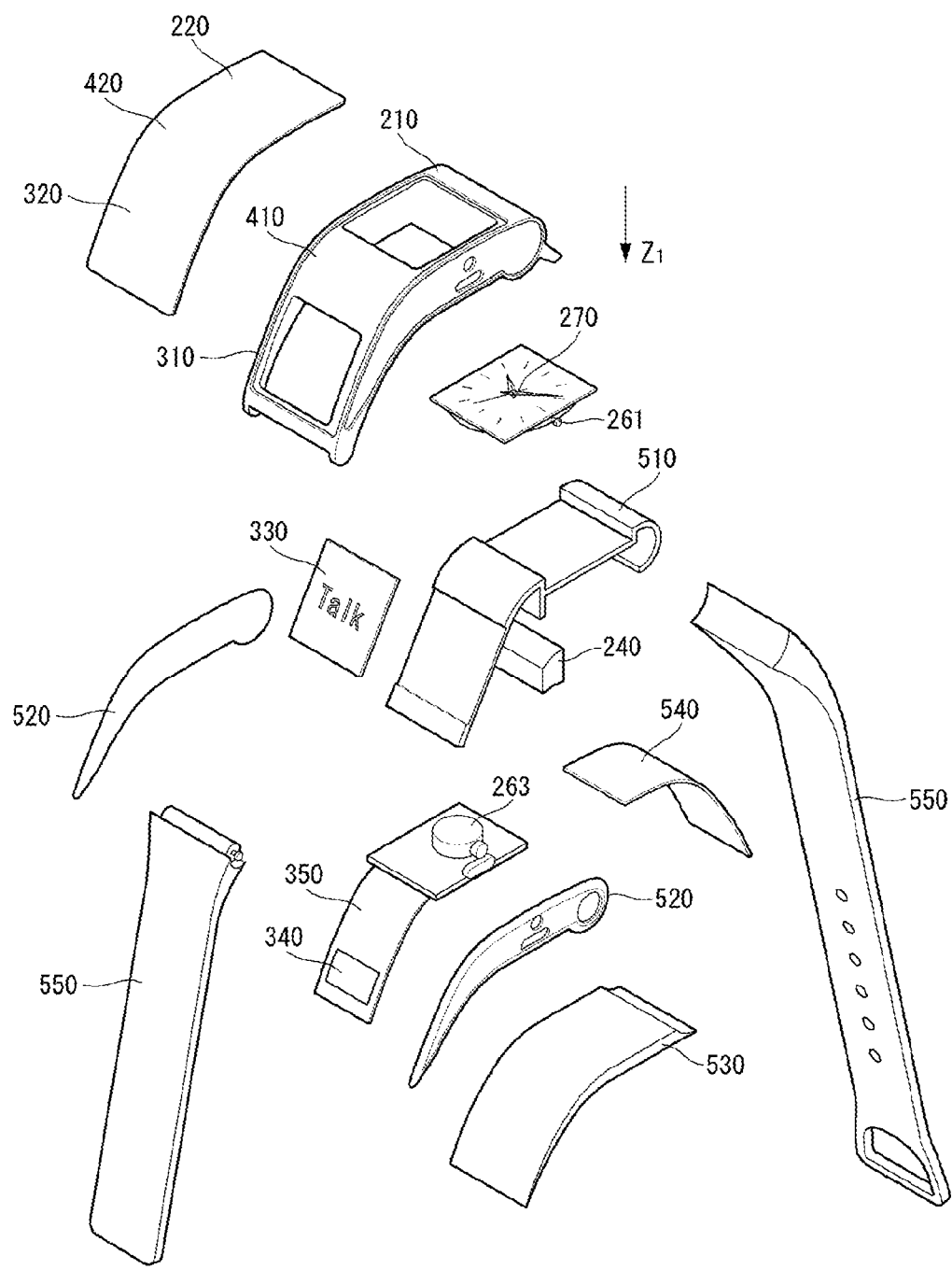
FIG. 7 is an exploded perspective diagram of the electronic device shown in FIG. 6.

FIG. 7 is an exploded perspective diagram of the electronic device shown in FIG. 6. The first watch module 200 according to an embodiment of the present invention may include a first power unit 240, a watch movement 260, and a watch hand 270.

The first power unit 240 may be located on at least one of the first body 210, the second body 310, and the third body 410. The first power unit 240 may supply basically power to the watch movement 260. The first power unit 240 may be a battery provided in a general mechanical watch.

The watch movement 260 may be located in the first body 210. The first watch module 200 according to an embodiment of the present invention may perform functions of a general mechanical watch. In the first watch module 200, the watch hand 270 may be moved periodically by receiving power from the watch movement 260. In other words, the watch hand 270 may display time. The first watch module 200 may additionally have a configuration that displays day of week or date. A panel for displaying numbers may be inserted between the watch movement 260 and the watch hand 270. The watch movement 260 may be provided with a motor that generates power and gears that transmit the watch hand 270 with the power received from the motor.

The watch hand 270 may receive power from the watch movement 260. The watch hand 270 may be located between the watch movement 260 and the first window 220.

The electronic device according to an embodiment of the present invention may include a frame 510. The frame 510 can be located in the first body 210, the second body 310, and the third body 410. The watch movement 260 and the watch hand 270 may be located between the first window 220 and the frame 510.

The second watch module 300 may include a second display 330, a second power unit 340, and a circuit board 350.

The second display 330 may be connected to the circuit board 350 and the second power unit 340. The second display 330 may be located between the circuit board 350 and the second window 320. As shown in FIG. 7, the second display 330 may be located between the second window 320 and the frame 510.

The circuit board 350 may be connected to the second display 330 and the second power unit 340. The circuit board 350 may be located in at least one of the first body 210, the second body 310, and the third body 410. The circuit board 350 may provide information for the second display 330. The information sent to the second display 330 may be displayed on the second display 330, and visual information displayed on the second display 330 may be transmitted to the outside through the second window 320. The circuit board 350, as described below, may be involved in performing functions of the first watch module 200.

The circuit board 350 and the second display 330 may not receive power supplied directly from the first power unit 240. The first watch module 200 may perform functions as a general watch. Thus, power consumption of the first power unit 240 in the second watch module 300 may be an obstacle to performing functions as a general watch of the first watch module 200.

The second power unit 340 may be connected to the circuit board 350 and the second display 330, and supply power to the circuit board 350 and the second display 330. Since the second watch module 300 can provide functions as a smart watch, the second watch module 300 may consume a lot of power. Therefore, the second power unit 340 may be charged by receiving power from outside. In other words, the second power unit 340 may be rechargeable.

The electronic device according to an embodiment of the present invention may include a side cover 520, a back cover 530, an antenna 540, and a strap 550.

The side covers 520 may be located on a side of the first watch module 200 and a side of the second watch module 300 in a direction of connecting the first watch module 200 to the second watch module 300.

The back cover 530 may be located on a lower surface of the first body 210, the second body 310, and the third body 410. The back cover 530 may face the first window 220, the second window 320, and the third window 420. The back cover 530 may form part of the exterior of the electronic device according to an embodiment of the present invention.

An antenna 540 may be needed in order that the second watch module 300 performs networking. The antenna 540 may be connected to the circuit board 350, and located on the strap 550.

The strap 550 may be connected to one side of the first watch module 200 and one side of the second watch module 300. The electronic device according to an embodiment of the present invention can be worn on the user's wrist. Thus, the strap 550 may provide a fastening means so that the electronic device can be worn on the user's wrist. A user' body on which the electronic device according to an embodiment of the present invention is worn may not be limited to the wrist.

Figure 8:
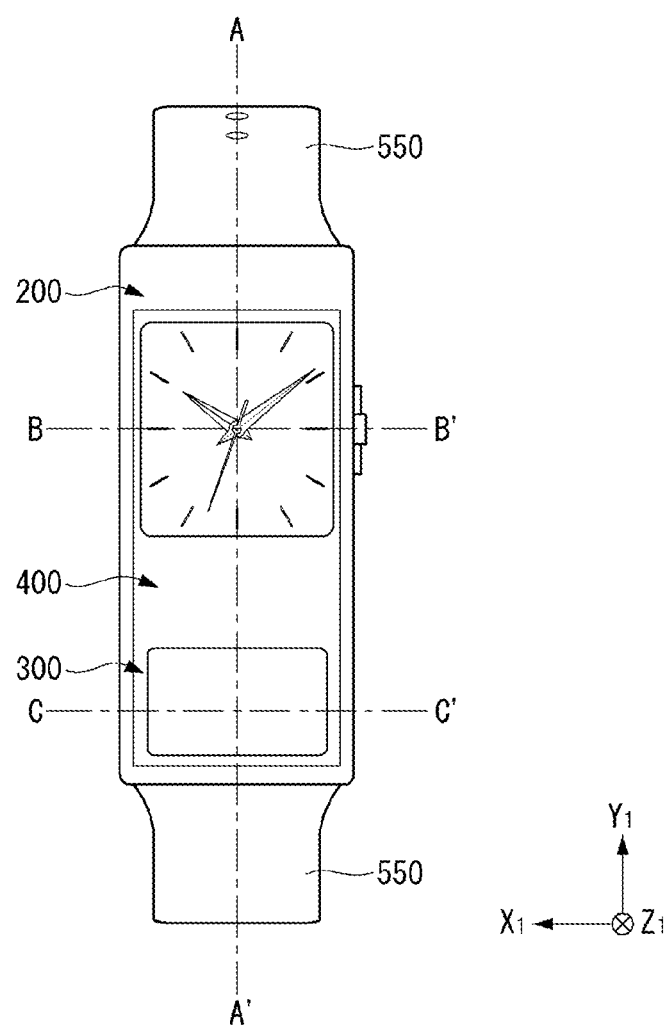
FIG. 8 is a top diagram of the electronic device shown in FIG. 6.

FIG. 8 is a top diagram of the electronic device shown in FIG. 6. FIG. 8 is a diagram seeing an upper part of the first watch module 200 in the front. Since the first window 220 may be located on the upper part of the first watch module 200, the first window 220 may be represented with respect to the $X_1Y_1Z_1$ coordinate system.

Since the second watch module 300 can be formed by bending with respect to the first watch module 200, as shown in FIG. 8, the second watch module 300 can be seen obliquely. The third watch module 400 can connect the first watch module 200 to the second watch module 300. The strap 550 may be connected to one side of the first watch module 200 and one side of the second watch module 300.

Figure 9:
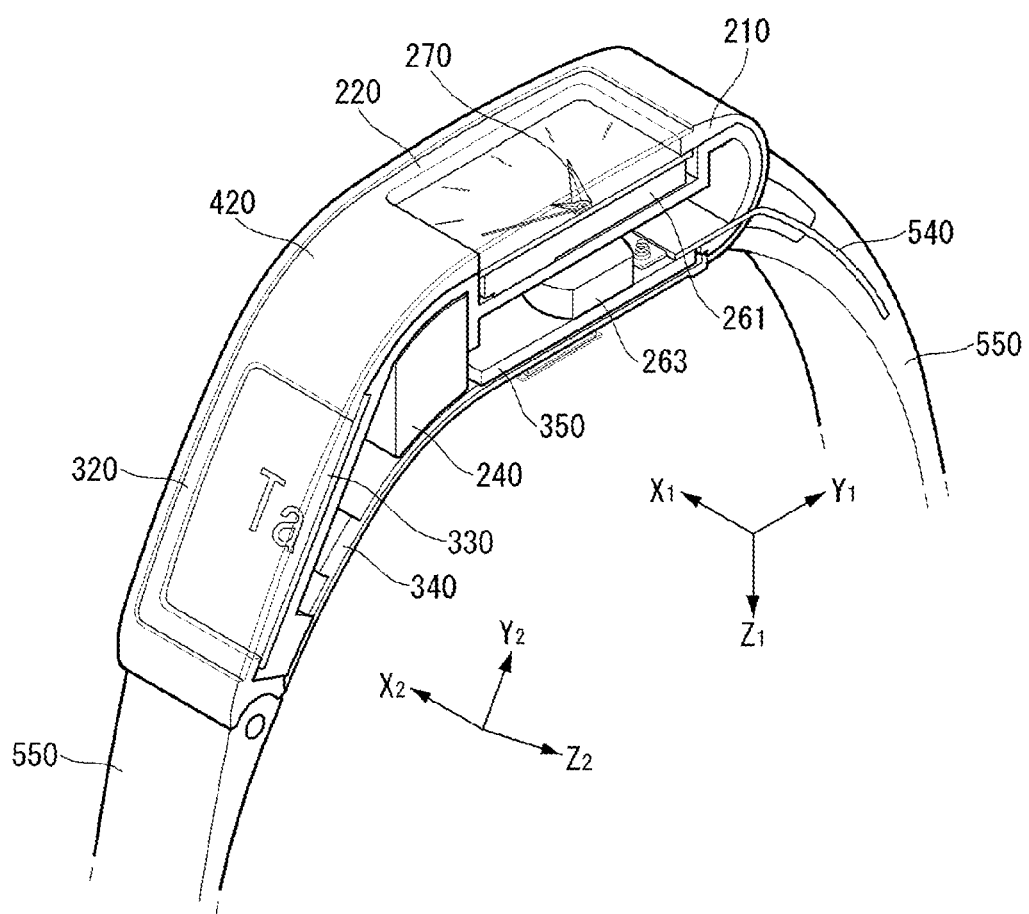
FIG. 9 is a perspective diagram of a cross section cut the electronic device shown in FIG. 8 along A-A'.

FIG. 9 is a perspective diagram of a cross section cut the electronic device shown in FIG. 8 along A-A'. As shown in FIG. 9, the first watch module 200 and the second watch module 300 according to an embodiment of the present invention may form a bending. The third watch module 400 may be connected to the first watch module 200 and the second watch module 300 so that the first watch module 200 and the second watch module 300 may form a bending. The third watch module 400, although not shown in the drawings, may be provided with a separate display. Here, the separate display may perform an auxiliary function of the second display 330, and visual information may be transmitted through the third window 420.

The $X_1Y_1Z_1$ coordinate system and the $X_2Y_2Z_2$ coordinate system may correspond to the $X_1Y_1Z_1$ coordinate system and the $X_2Y_2Z_2$ coordinate system shown in FIG. 6, respectively. In other words, the $X_1Y_1Z_1$ coordinate system may be set so that the first window 220 may be located on the $X_1Y_1$ plane. In addition, the $X_2Y_2Z_2$ coordinate system may be set so that the second window 320 may be located on the $X_2Y_2$ plane. The first window 220 and the second window 320 may be not a complete plane but at least partially curved surface. In this case, coordinate system may be located on an averaged plane of the curved surfaces. In a case that at least some of the first window 220 is bent, the $X_1Y_1$ plane may be located on plane of the state averaging operation is made with respect to differential area of the first window 220. A case of the second window 320 may be similar to the case of the first window 220.

Here, the plane by the averaging operation can be represented by an average normal vector $\vec{V}$, it may be defined as follows:

$$\vec{V} = \frac{\oiint \overrightarrow{u(x,y)} \cdot dx \cdot dy}{\oiint dx \cdot dy}$$

In the above equation, a differential area at a point of the curved surface of the first window 220 may be expressed by the product of X-axis differential length dx and Y-axis differential length dy in an arbitrary XYZ coordinate system formed along the curved surface of the first window 220. $\overrightarrow{u(x,y)}$ may mean a normal vector at a point (x, y) of the first window 220. Therefore, the average normal vector may be represented as the above equation. If the average normal vector is calculated, a normal plane to the average normal vector could be the $X_1Y_1$ plane, and a direction of the average normal vector could be $Z_1$ direction. Here, the $Z_1$ direction may include both the negative $Z_1$ direction and the positive $Z_1$ direction. The same is also the case that the second window 320 is formed in a curved surface.

The direction which the second window 320 faces outwards, as shown in FIG. 9, may be the negative $Z_2$-axis direction. The direction which the first window 220 faces outwards, as shown in FIG. 9, may be the negative $Z_1$-axis direction. The negative $Z_1$-axis direction may be inclined with respect to the negative $Z_2$-axis direction. In other words, the direction which the second window 320 faces outwards may form an angle with the direction which the first window 220 faces outwards.

Because the direction which the first window 220 faces outwards may be different from the direction which the second window 320 faces outwards, in case that the user use the electronic device according to an embodiment of the present invention worn on the user's wrist, the user can look at the second window 320 in the front even when the user is not looking at the first window 220 in the front. In other words, even if the user's eye may form an inclination with respect to $Z_1$-axis, the user's eye may be coincident with or parallel to $Z_2$-axis. In other words, even if the user does not rotate the wrist, the user may look at the substantial front of the second window 220. Thereby the user can eliminate the inconvenience in using and wearing the electronic device.

The first power unit 240 may be located within the third body 410. The first power unit 240 may be located in at least one body of the first body 210, the second body 310, and the third body 410. The first power unit 240 may supply power to the watch movement 260.

The second power unit 340 may be located in at least one body of the first body 210, the second body 310, and the third body 410. The second power unit 340 may supply power to the second display 330 and the circuit board 350.

The circuit board 350 may be located in at least one of the first body 210, the second body 310, and the third body 410. The controller 180, see FIG. 1, may be mounted on the circuit board 350. The circuit board 350 may perform wireless networking by being connected to the antenna 540. The circuit board 350 may be involved in providing power between the first power unit 240 and the second power unit 340 by being connected to the first power unit 240 and the second power unit 340.

Figure 10:
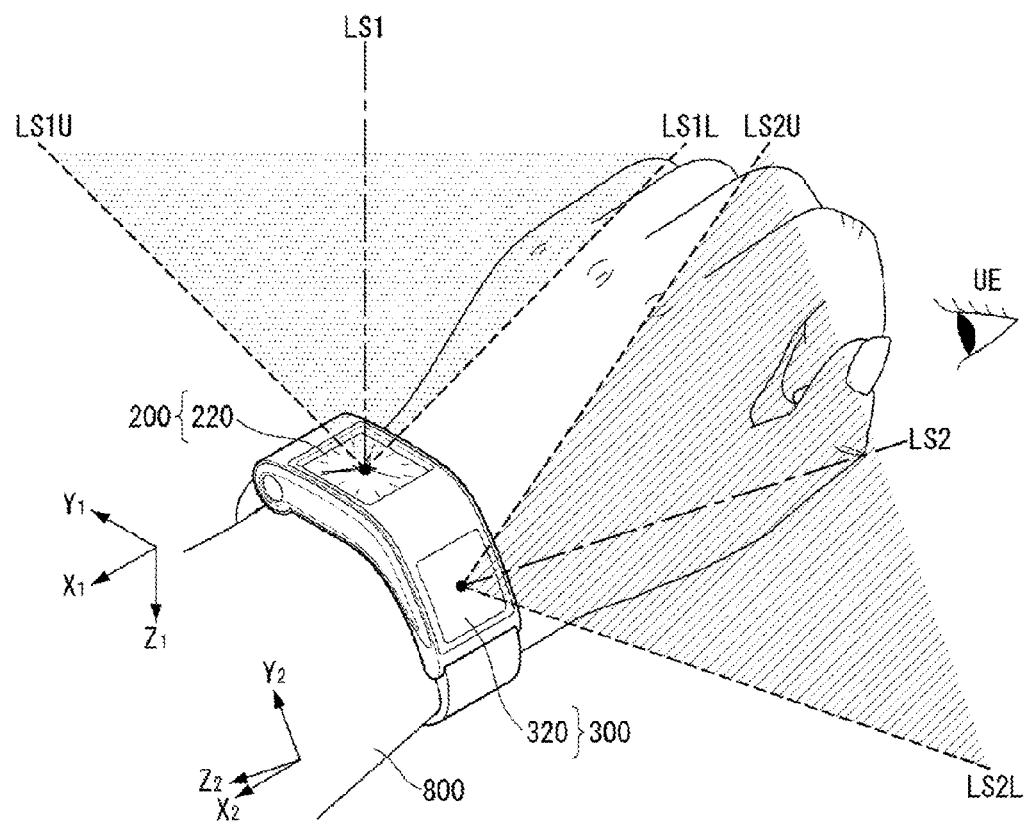
FIG. 10 is a diagram illustrating an embodiment of an electronic device worn on a user according to an embodiment of the present invention.

FIG. 10 is a diagram illustrating an embodiment of an electronic device worn on a user according to an embodiment of the present invention. As shown in FIG. 10, the electronic device according to an embodiment of the present invention can be worn on the user 800. In particular, the electronic device according to an embodiment of the present invention can be worn on the user's wrist 800.

The electronic device according to an embodiment of the present invention may include the first watch module 200 and the second watch module 300. The first watch module 200 may include the first window 220. The second watch module 300 may include the second window 320.

The directions which the first window 220 and the second window 320 face outwards, as shown in FIG. 10, are LS1 and LS2, respectively. The first window 220 has a viewing angle. It may be difficult to determine visual information transmitted through the first window 220 in a position outside of the viewing angle. The first window 220 may have a viewing angle between LS1U and LS1L around the LS1. Dotted area may represent the viewing angle range of the first window 220. The second window 320 may have a viewing angle between LS2U and LS2L around the LS2. Hatched area may represent the viewing angle range of the second window 320.

The first watch module 200, as shown in FIG. 10, may be located on the upper part of the user's wrist 800. The second watch module 300, as shown in FIG. 10, may be located on the side led from the upper part of the user's wrist 800. Therefore, the eye UE of the user 800 may be placed naturally within the viewing angle range of the second window 320. In other words, the user 800 can naturally check the information displayed in the second window 320 even without twisting or moving the user's wrist, the user's arm, the user's body or the user's neck.

Figure 11:
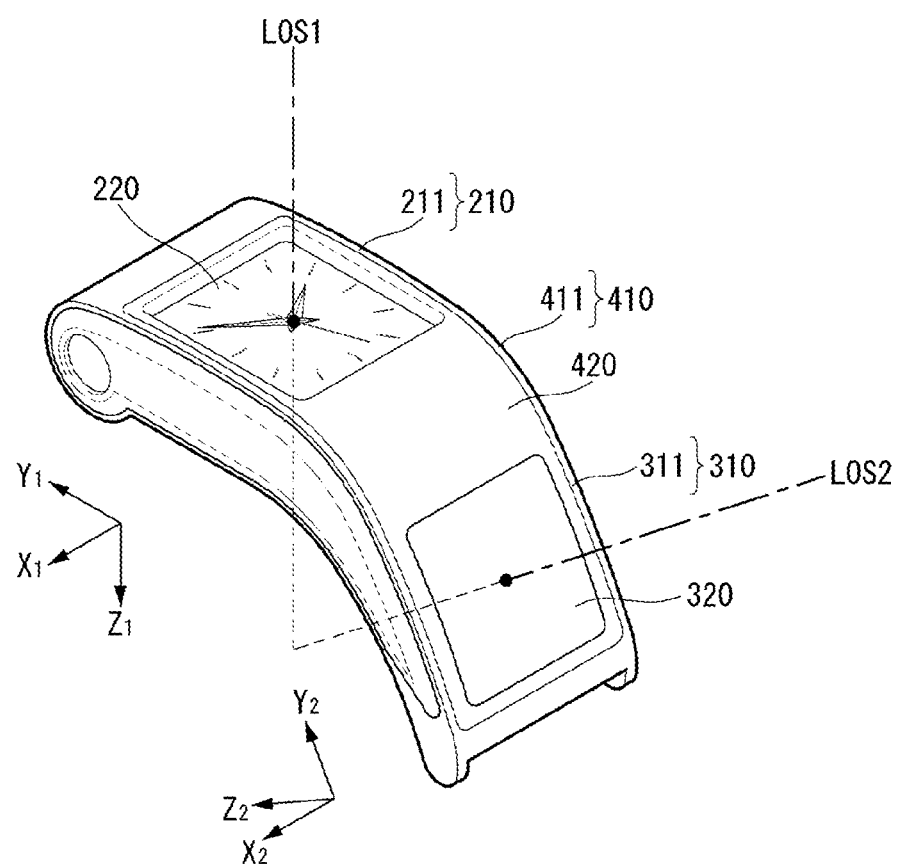
FIG. 11 is a diagram illustrating a first window and a second window according to an embodiment of the present invention.

FIG. 11 is a diagram illustrating a first window and a second window according to an embodiment of the present invention. The electronic device according to an embodiment of the present invention may include a first watch module 200, a second watch module 300, and a third watch module 400. The first watch module 200 may include a first body 210 that has a first upper part 211 and a first window 220. The second watch module 300 may include a second body 310 that has a second upper part 311 and a second window 320. The third watch module 400 may include a third body 410 that has a third upper part 411 and a third window 420.

A direction which the first window 220 faces outwards may be referred to as LOS1. LOS1 may be the negative $Z_1$ direction in the $X_1Y_1Z_1$ coordinate system. Here, the $X_1Y_1Z_1$ coordinate system may be the Cartesian coordinate system for explaining location of the first window 220. The first window 220 may be substantially located on the $X_1Y_1$ plane. Because the first window 220 is located on the first upper part 211, a direction which the first upper part 211 faces outwards may be referred to as LOS1.

A direction which the second window 320 faces outwards may be referred to as LOS2. LOS2 may be the negative $Z_2$ direction in the $X_2Y_2Z_2$ coordinate system. Here, the $X_2Y_2Z_2$ coordinate system may be the Cartesian coordinate system for explaining location of the second window 320. The second window 320 may be substantially located on the $X_2Y_2$ plane. Because the second window 320 is located on the second upper part 311, a direction which the second upper part 311 faces outwards may be referred to as LOS2.

Directions of LOS1 and LOS2, as shown in FIG. 11, may be different from each other. That is, LOS1 may form an inclination with respect to LOS2. When LOS1 passes through a center of the first window 220, and LOS2 passes through a center of the second window 320, the respective extension of LOS1 and LOS2 can meet in a single point. In other words, LOS1 and LOS2 may be located on a single plane.

The directions of LOS1 and LOS2 may be different from each other. Therefore, the directions which the first window 220 and the second window 320 face outwards may be different from each other. In other words, the directions which the first upper part 211 and the second upper part 311 face outwards may be different from each other.

Figure 12:
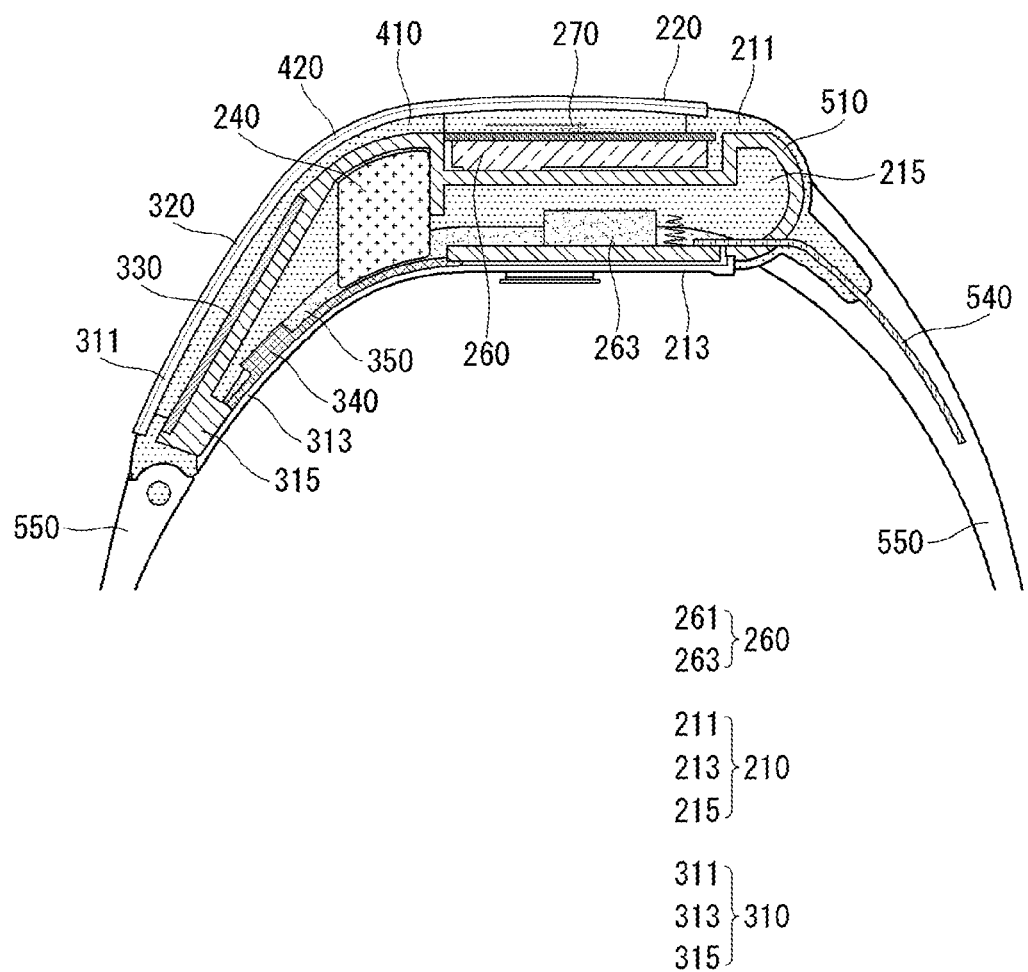
FIG. 12 is a cross sectional diagram cut the electronic device shown in FIG. 8 along A-A'.

FIG. 12 is a cross sectional diagram cut the electronic device shown in FIG. 8 along A-A'. In FIG. 12, $Y_1Z_1$ plane may be identical to $Y_2Z_2$ plane.

The first body 210 may include a first upper part 211, a first lower part 213, and a first side part 215. The first window 220 may be located on the first upper part 211. The first lower part 213 is opposite to the first upper part 211. The first lower part 213 may form part of an outer surface of the first body 210. The first side part 215 may connect the first upper part 211 to the first lower part 213. The first side part 215, as shown in FIG. 12, may be located on the $Y_1Z_1$ plane.

The second body 310 may include a second upper part 311, a second lower part 313, and a second side part 315. The second window 320 may be located on the second upper part 311. The second lower part 313 is opposite to the second upper part 311. The second lower part 313 may form part of an outer surface of the second body 310. The second side part 315 may connect the second upper part 311 to the second lower part 313. The second side part 315, as shown in FIG. 12, may be located on the $Y_2Z_2$ plane.

A direction which the first window 220 faces outwards, as shown in FIG. 12, may be a negative $Z_1$ direction. A direction which the second window 320 faces outwards, as shown in FIG. 12, may be a negative $Z_2$ direction. As shown in FIG. 12, the $Z_1$-axis may form an inclination with respect to the $Z_2$-axis. That is, the direction which the first window 220 faces outwards may form an angle with the direction which the second window 320 faces outwards.

As it moves along the positive $Y_2$-axis on the second upper part 311, a length of the second body 310 in the $Z_2$-axis can change. In other words, the second upper part 311 and the second lower part 313 may form an inclination. That is, the second upper part 311 and the second lower part 313 may not be parallel to each other.

By forming the second upper part 311 inclined with respect to the second lower part 313, when the user is wearing on the user's wrist an electronic device according to an embodiment of the present invention, the user's eye may be easily positioned within the viewing angle range of the second window 320.

The shape of the wrist that is wearing an electronic device can have a predetermined shape, when the electronic device is worn on the user's wrist, a bending angle of the second body 310 in the first body 210 may be corresponding to the shape of the wrist. Therefore, as compared to a case that the second window 320 is located corresponding to the shape of the wrist, by forming the second window 320 inclined with respect to the second lower part 313, the user's eye may be easily positioned within the viewing angle range of the second window 320. Here, an angle that the second window 320 forms with respect to the second lower part 313 may refer to an angle formed along the $Y_2$-axis.

Figure 13:
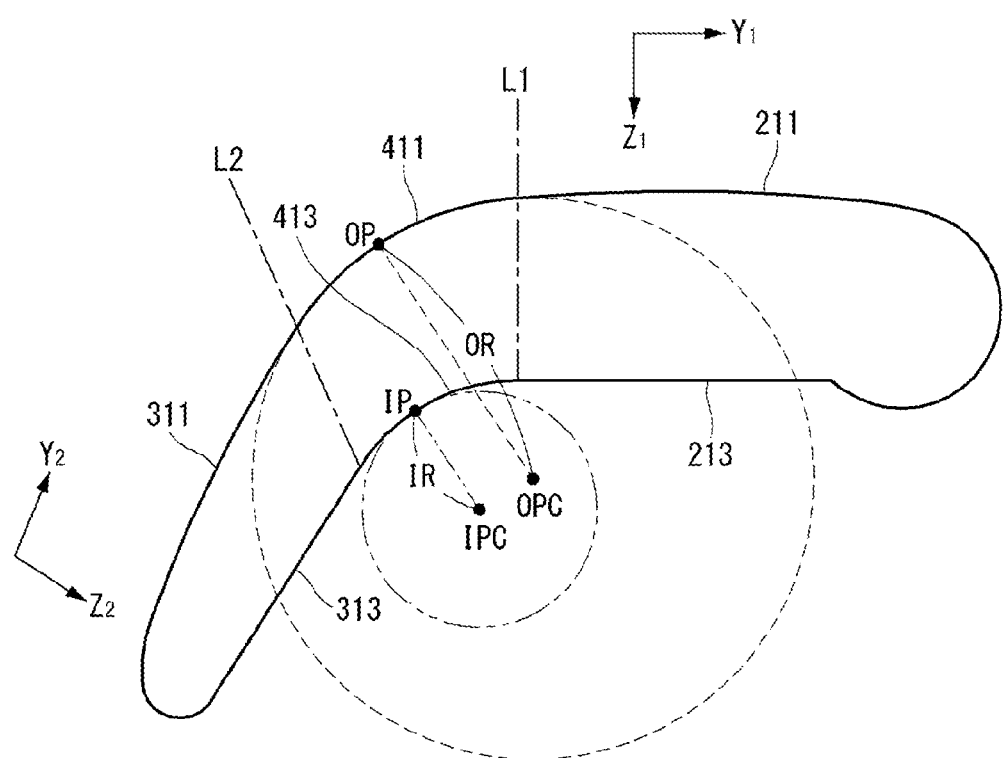
FIG. 13 is a diagram illustrating curvature of a cross section cut the electronic device shown in FIG. 8 along A-A'.

FIG. 13 is a diagram illustrating curvature of a cross section cut the electronic device shown in FIG. 8 along A-A'. As shown in FIG. 13, the third body may include a third upper part 411 and a third lower part 413.

A radius of curvature of the third upper part 411 may be greater or equal to a radius of curvature of the third lower part 413. In other words, the radius of curvature of the third lower part 413 may be smaller than the radius of curvature of the third upper part 411.

In FIG. 13, OP may indicate a point of the third upper part 411, and IP may indicate a point of the third lower part 413. OPC may indicate a center of a circle corresponding to a circular arc of the OP, and IPC may indicate a center of a circle corresponding to a circular arc of the IP. OR is a distance from the OP to the OPC and may indicate the radius of curvature of the OP. IR is a distance from the IP to the IPC and may indicate the radius of curvature of the IP. The radius of curvature of the third lower part 413 IR may be smaller than the radius of curvature of the third upper part 411 OR.

The radius of curvature of the third lower part 413 IR may indicate the radius of curvature of the IP that is a point of the third lower part 413. Therefore, in case the radius of curvature of the third lower part 413 depends on a point of the third lower part 413, it may utilize a concept of an averaged radius of curvature. Also, in case the radius of curvature of the third upper part 411 depends on a point of the third upper part 411, it may utilize a concept of an averaged radius of curvature. In other words, the radius of curvature of the third lower part 413 may be smaller than the radius of curvature of the third upper part 411.

Here, an averaged radius of curvature of the third lower part 413 AIR can be defined as follows.

$$AIR(\text{Averaged } IR) = \frac{\int IR(k) \cdot dk}{\int dk}$$

In the above equation, the k is a variable that represents a point of the curve of the third lower part 413 and the dk may mean a differential length at the k. In the above equation, an integral interval may mean a whole interval of the curve of the third lower part 413. In the above equation, the IR(k) may mean a radius of curvature at the k.

An averaged radius of curvature of the third upper part 411 AOR can be defined as follows.

$$AOR(\text{Averaged } OR) = \frac{\int OR(k) \cdot dk}{\int dk}$$

In the above equation, the k is a variable that represents a point of the curve of the third upper part 411 and the dk may mean a differential length at the k. In the above equation, an integral interval may mean a whole interval of the curve of the third upper part 411. In the above equation, the OR(k) may mean a radius of curvature at the k.

Figure 14:
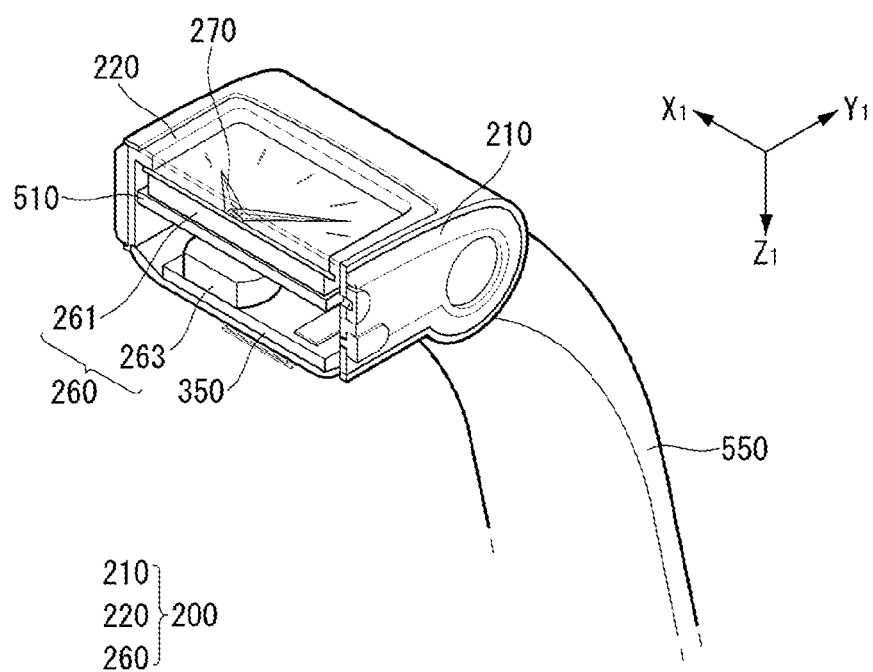
FIG. 14 is a perspective diagram of a cross section cut the electronic device shown in FIG. 8 along B-B'.

FIG. 14 is a perspective diagram of a cross section cut the electronic device shown in FIG. 8 along B-B'. Looking at the first watch module 200 that is cut along the B-B', along $Z_1$-axis from the first window 220, the first window 220, the watch hand 270, the gear 261, the frame 510, the motor 263, and the circuit board 350 can be arranged in the listed order.

The first watch module 200 may provide functions of a general mechanical watch. The motor 263 may receive power from a battery and transmit a driving force to the gear 261. The gear 261 may transmit a driving force to the watch hand 270. The watch hand 270 may be moved by the driving force received. For example, the watch hand 270 may indicate time by rotating on an axis. At this time, the watch movement 260 having the gear 261 and the motor 263 may provide a rotational force to the watch hand 270.

Figure 15:
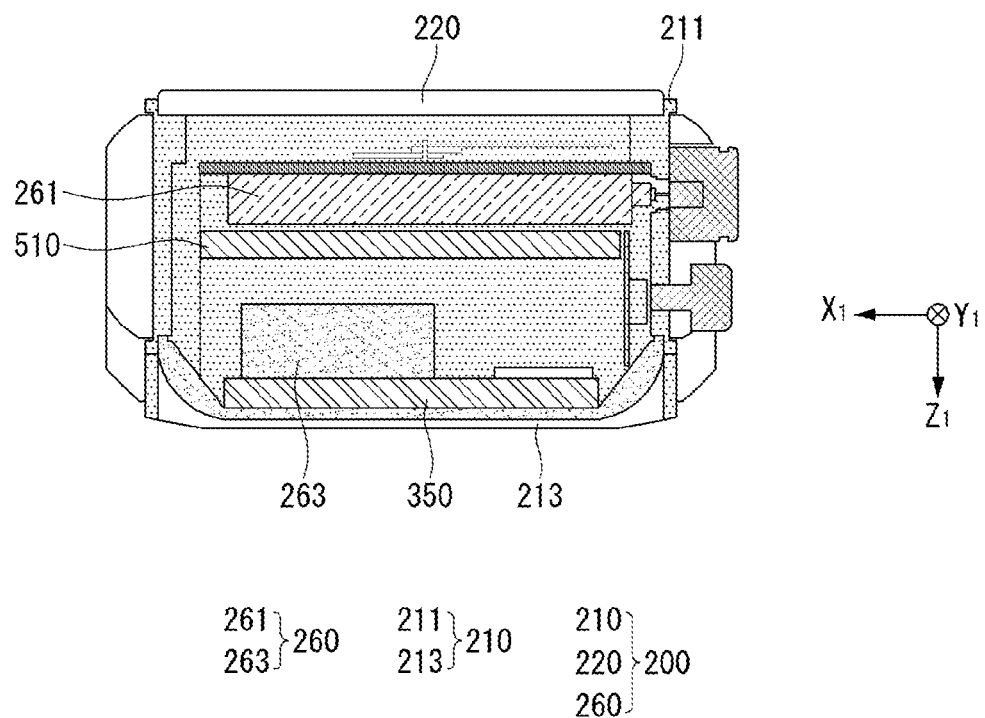
FIG. 15 is a cross sectional diagram cut the electronic device shown in FIG. 8 along B-B'.

FIG. 15 is a cross sectional diagram cut the electronic device shown in FIG. 8 along B-B'. As shown in FIG. 15, the cross sectional diagram cut the electronic device shown in FIG. 8 along the B-B' may be located on $X_1Z_1$ plane.

As shown in FIG. 15, looking at a length of the first watch module 200 on $Z_1$-axis, moving along $X_1$-axis in the first upper part 211 of the first watch module 200, the length of the first watch module 200 on the $Z_1$-axis may be constant along the $X_1$-axis in the first upper part 211 of the first watch module 200.

Figure 16:
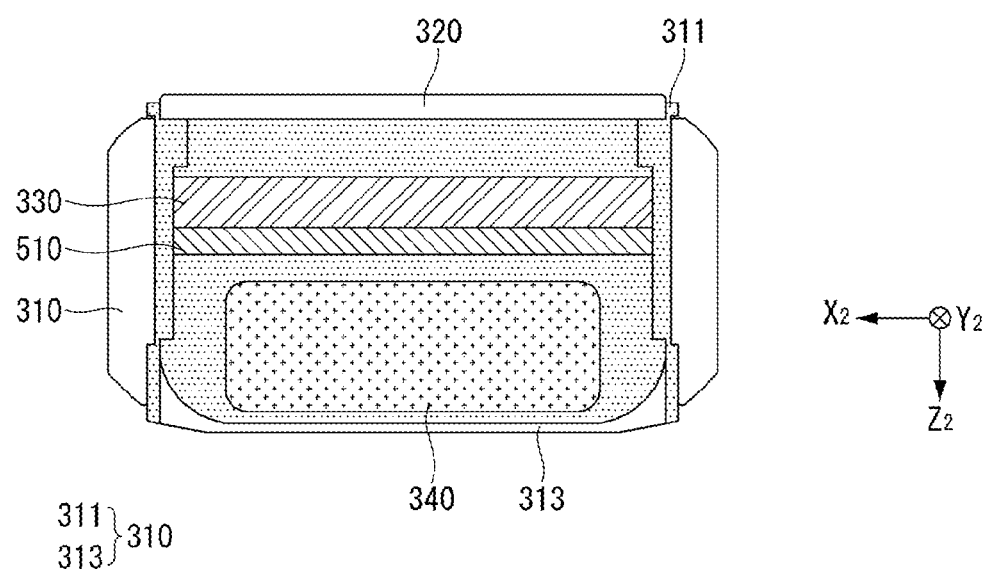
FIG. 16 is a cross sectional diagram cut the electronic device shown in FIG. 8 along C-C'.

FIG. 16 is a cross sectional diagram cut the electronic device shown in FIG. 8 along C-C'. Looking at the second watch module 300 that is cut along the C-C', along $Z_2$-axis from the second window 320, the second window 320, the second display 330, the frame 510, and the second power unit 340 can be arranged in the listed order.

Looking at a length of the second watch module 300 on $Z_2$-axis, moving along $X_2$-axis in the second window 320 located on the second upper part 311 of the second watch module 300, the length of the second watch module 300 on the $Z_2$-axis may be constant along $X_2$-axis in the second upper part 311 of the second watch module 300.

Figure 17:
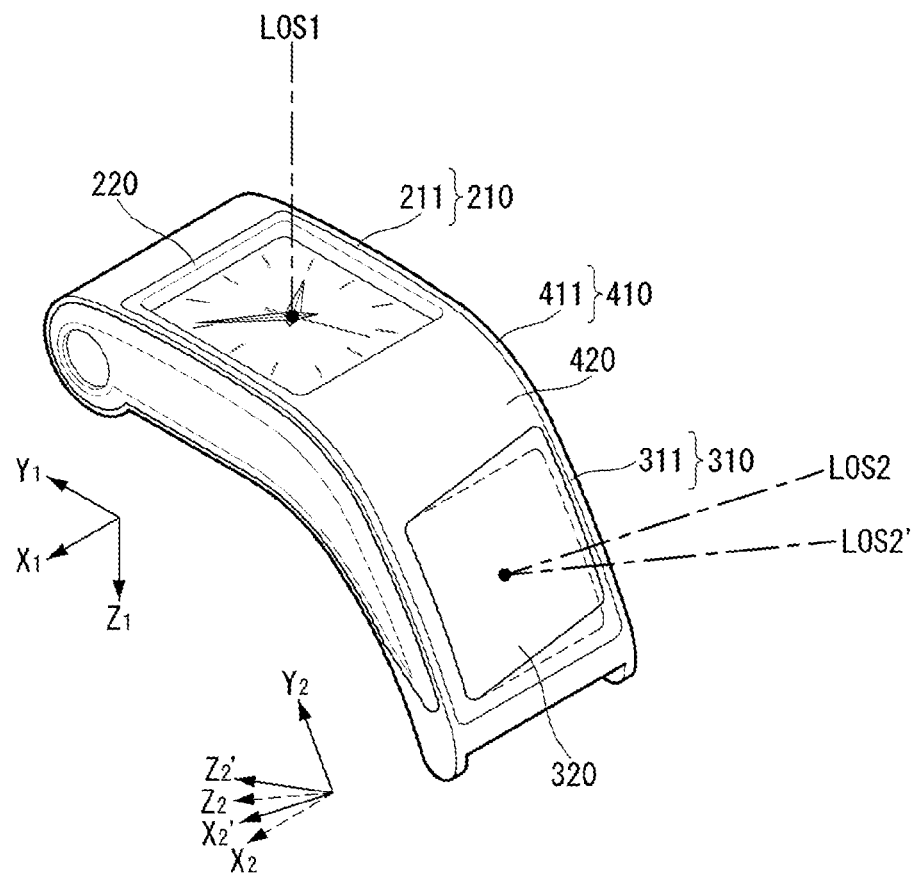
FIG. 17 is a perspective diagram of a second watch module according to an embodiment of the present invention.

FIG. 17 is a perspective diagram of a second watch module according to an embodiment of the present invention. The second watch module according to an embodiment of the present invention may include a first watch module 200, a second watch module 300, and a third watch module 400. The first watch module 200 may include a first body 210 that has a first upper part 211 and a first window 220. The second watch module 300 may include a second body 310 that has a second upper part 311 and a second window 320. The third watch module 400 may include a third body 410 that has a third upper part 411 and a third window 420. The third watch module 400 can connect the first watch module 200 to the second watch module 300. The first watch module 200 and the second watch module 300 may be connected by forming a bending. The first window 220, the third window 420 and the second window 320 may be connected in series in the listed order.

A direction which the first window 220 faces outwards may be referred to as LOS1. LOS1 may be a negative $Z_1$ direction in the $X_1Y_1Z_1$ coordinate system. Here, the $X_1Y_1Z_1$ coordinate system may be the Cartesian coordinate system for explaining location of the first window 220. The first window 220 may be substantially located on the $X_1Y_1$ plane. Because the first window 220 is located on the first upper part 211, a direction which the first upper part 211 faces outwards may be referred to as LOS1.

A direction which the second window 320 faces outwards may be referred to as LOS2'. LOS2' may be a negative $Z'_2$ direction in the $X'_2Y'_2Z'_2$ coordinate system. Here, the $X'_2Y'_2Z'_2$ coordinate system may be the Cartesian coordinate system for explaining location of the second window 320. The second window 320 may be substantially located on $X'_2Y'_2$ plane. Because the second window 320 is located on the second upper part 311, a direction which the second upper part 311 faces outwards may be referred to as LOS2'. Here, it is described as compared with the $X_2Y_2Z_2$ coordinate system and LOS2 shown in FIG. 10.

$X_2$-axis may be the same direction as the $X_1$-axis in the $X_2Y_2Z_2$ coordinate system. LOS2 may be located in the same plane as LOS1. The $X'_2Y'_2Z'_2$ coordinate system may be described in relation to the $X_2Y_2Z_2$ coordinate system. That is, the $X'_2Y'_2Z'_2$ coordinate system may be formed by rotating the $X_2Y_2Z_2$ coordinate system with a predetermined angle on $Y_2$-axis. In other words, an angle between $X'_2$ and $X_2$ may be the same as the angle between $Z'_2$ and $Z_2$. In other words, the $X'_2Z'_2$ plane may be formed by rotating the $X_2Z_2$ plane with a predetermined angle on $Y_2$-axis.

The direction which the second window 320 faces outwards LOS2' may form an angle from LOS1 and be explained by the parameters LOS2. LOS2 may be formed by rotating LOS1 with a predetermined angle on $X_1$-axis. That is, LOS2 may be formed by rotating LOS1 with a predetermined angle on $X_2$-axis. LOS2' may be formed by rotating LOS2 with a predetermined angle on $Y_2$-axis. LOS2' may be located in the same plane as LOS2, however, LOS2' may not be located in the same plane as LOS1. By forming LOS2', the user can look easily at the second window 320.

Figure 18:
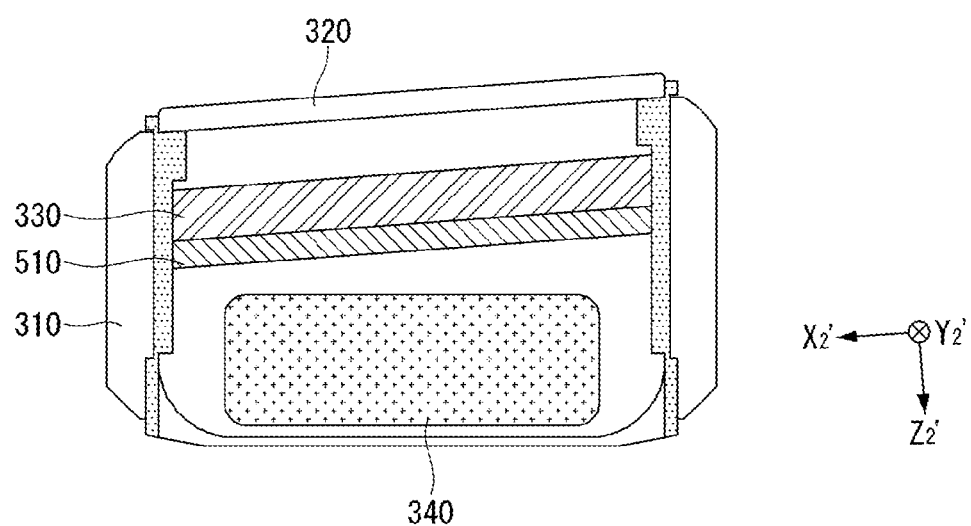
FIG. 18 is a cross-sectional diagram of the second watch module shown in FIG. 17.

FIG. 18 is a cross-sectional diagram of the second watch module shown in FIG. 17. Looking at a length of the second watch module 300 on $Z'_2$-axis, moving along $X'_2$-axis in the second window 320 located on the second upper part 311 of the second watch module 300, the length of the second watch module 300 on the $Z'_2$-axis may be increased along the $X'_2$-axis in the second upper part 311 of the second watch module 300. Alternatively, the length of the second watch module 300 on the $Z'_2$-axis may be decreased along the $X'_2$-axis in the second upper part 311 of the second watch module 300.

The second upper part 311 may form an inclination along the $Z'_2$-axis with respect to the second lower part 313. In other words, the second upper part 311 may form an inclination along a direction perpendicular to a direction from the first watch module 200 to the second watch module 300. Here, an angle that the second upper part 311 forms with respect to the second lower part 313 may include an angle formed along a direction perpendicular to a direction from the first watch module 200 to the second watch module 300.

The inclination of the second upper part 311 may be formed to be perpendicular to a direction from the first watch module 200 to the second watch module 300. Thus, the user's eye may be easily positioned within the viewing angle range of the second window 320.

Figure 19:
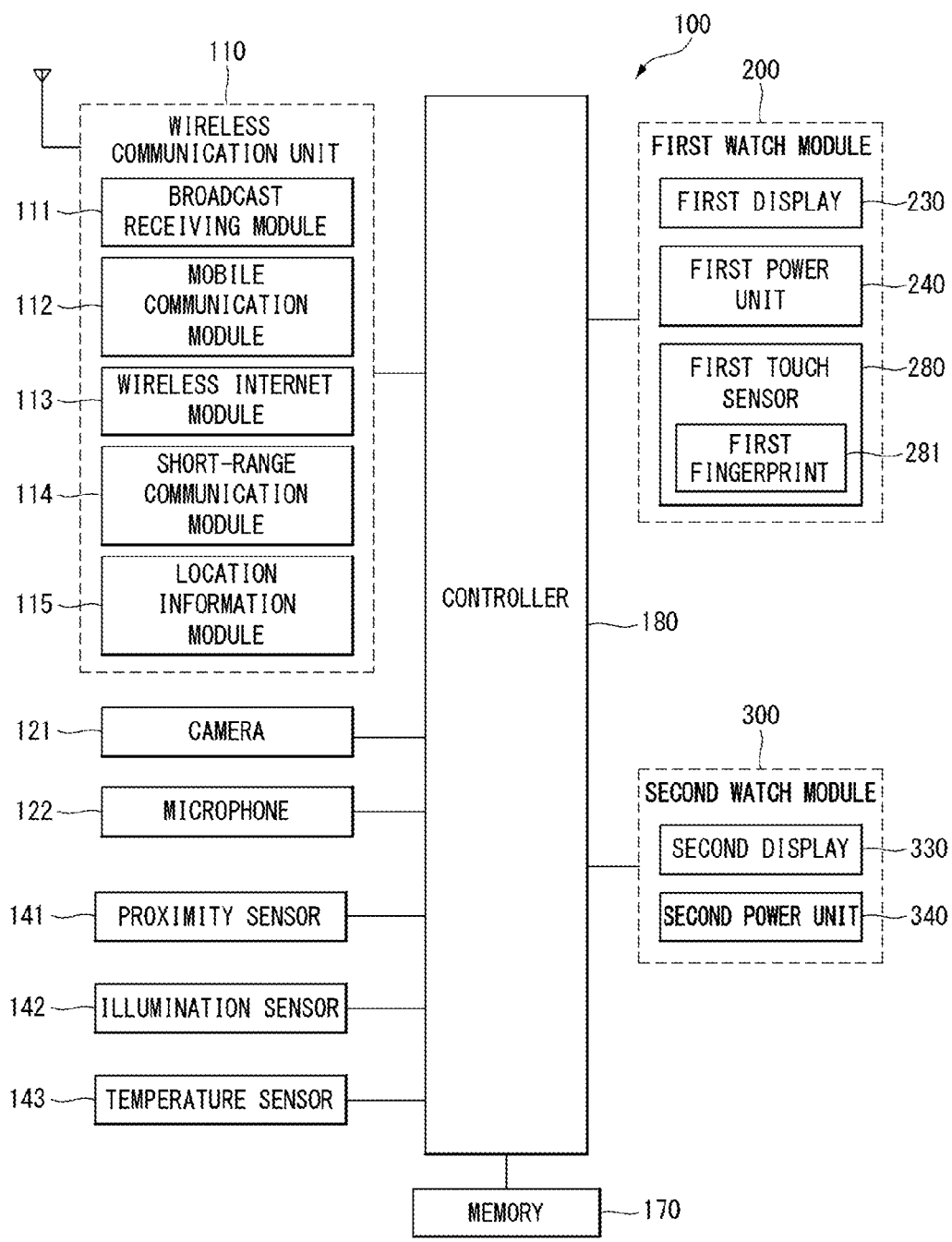
FIG. 19 is a block diagram illustrating an electronic device according to an embodiment of the present invention.

FIG. 19 is a block diagram illustrating an electronic device according to an embodiment of the present invention. The electronic device according to an embodiment of the present invention may include a controller 180, a first watch module 200, and a second watch module 300. The controller 180 may be mounted on a circuit board 350.

The first watch module 200 may include a first display 230. The first display 230 may be located between a first window 220 and a watch hand 270. The first display 230 may be provided with information by being connected to the controller 180 and display the provided information visually. The first display 230 may be provided with power by being connected to the first power unit 240.

The first watch module 200 may include a first touch sensor 280. The first window 220 may include the first touch sensor 280. The first touch sensor 280 may be attached to an inner surface of the first window 220. The first touch sensor 280 may obtain a touch input. The first touch sensor 280 may provide the touch input for the controller 180.

The first touch sensor 280 may include a first fingerprint sensor 281. The first fingerprint sensor 281 may obtain a user's fingerprint information. The first fingerprint sensor 281 may provide the user's fingerprint information for the controller 180.

The second watch module 300 may include a second display 330 and a second power unit 340. The second display 330 may be provided with information by being connected to the controller 180 and display the provided information visually. The second display 330 may also be provided with a touch input from the user. The second power unit 340 may be connected to the second display 330 and the controller 180 and provide power for the second display 330 and the controller 180.

Figure 20:
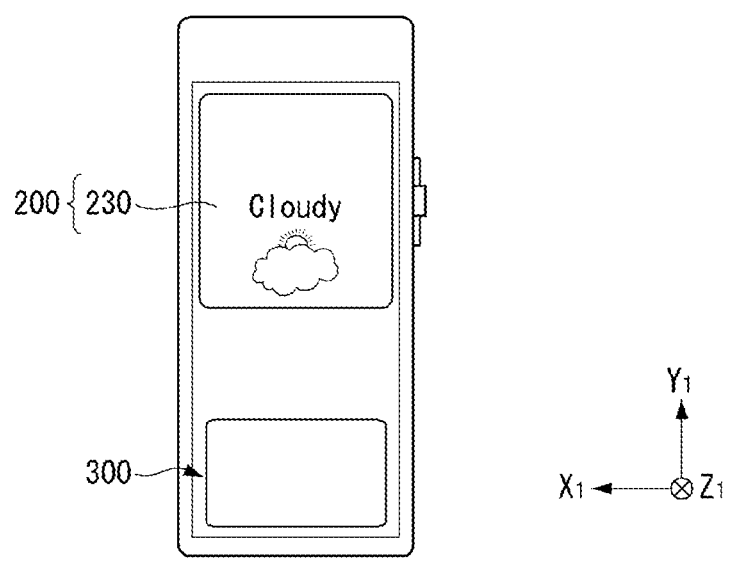
FIGS. 20 and 21 are diagrams illustrating various embodiments of a first display according to the present invention.
Figure 21:
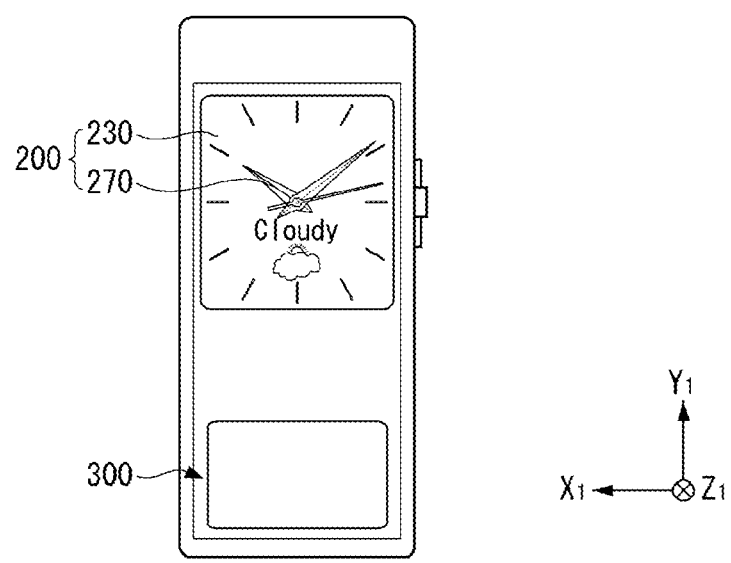

FIGS. 20 and 21 are diagrams illustrating various embodiments of a first display according to the present invention. A first watch module 200 may include a watch hand 270 and a first display 230.

The first display 230, as shown in FIG. 21, may be on a first display state in which movement of the watch hand 270 is projected through the first window 220 and information is displayed on the first display. Information displayed on the first display 230, as shown in FIG. 20, for example, may be weather information. When the first display 230 is in the first display state, the first display 230 may be transparent or translucent.

The first display 230, as shown in FIG. 20, may be on a third display state in which movement of the watch hand 270 is not projected through the first window 220 and information is displayed on the first display. That is, as shown in FIG. 20, when the first display 230 is in the third display state, an image projected through the first window 220 may be limited to an image of the first display 230.

The first display 230 may be on a second display state in which movement of the watch hand 270 is projected through the first window 220 but information is not displayed on the first display. When the first display 230 is in the second display state, the first display 230 may be not provided with information from the controller 180, or may be in a non-operating state.

Figure 22:
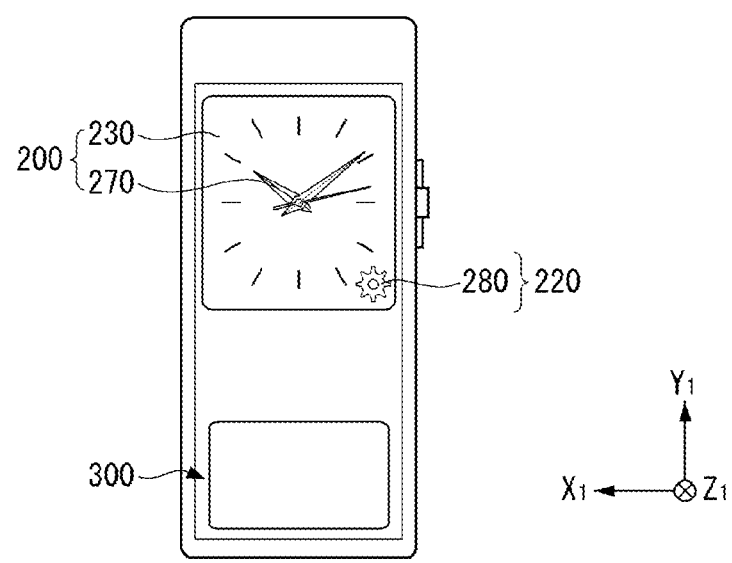
FIG. 22 is a diagram illustrating a first touch sensor according to an embodiment of the present invention.

FIG. 22 is a diagram illustrating a first touch sensor according to an embodiment of the present invention. As shown in FIG. 22, the first display 230 may be on the first display state. That is, the image of the watch hand 270 can be passed through the first display 230 and the first window 220. The first window 220 may include the first touch sensor 280. The controller 180 may receive an input obtained from the first touch sensor 280 and process the input.

The first touch sensor 280 may obtain a touch input. The first display 230 may provide an icon for providing convenience of the touch input. That is, the first touch sensor 280 may be located on a position corresponding to the icon provided by the first display 230 and obtain the touch input. The first display 230 may provide a plurality of icons. The plurality of icons can be changed according to the user's input. The first touch sensor 280 may obtain the touch input corresponding to the icon provided by the first display 230.

Figure 23:
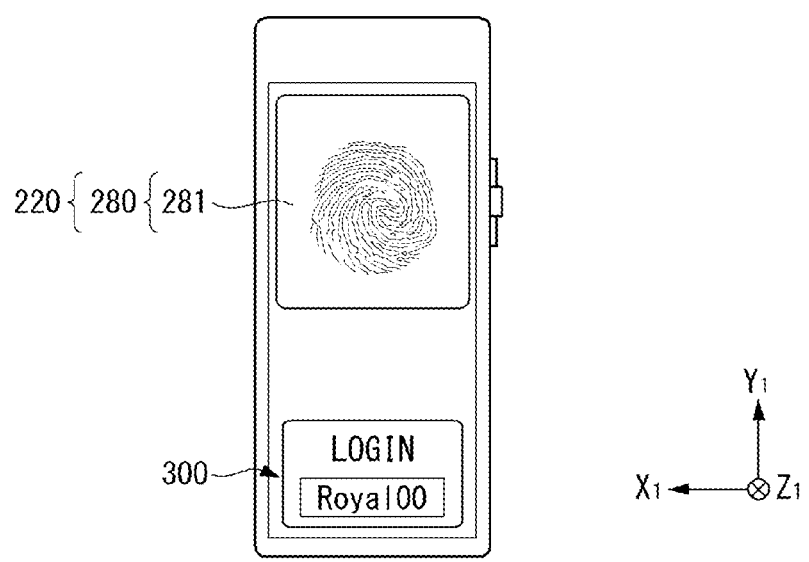
FIG. 23 is a diagram illustrating a first fingerprint sensor according to an embodiment of the present invention.

FIG. 23 is a diagram illustrating a first fingerprint sensor according to an embodiment of the present invention. A first touch sensor 280 may include a first fingerprint sensor 281. As shown in FIG. 23, the second watch module 300 may execute an application and, in particular, execute an application related to security. An application closely related to security may require information such as the user's fingerprint information prior to execution.

The first fingerprint sensor 281 may be provided for the first window 220. For example, the first fingerprint sensor 281 may be formed in contact with an inner side of the first window 220. FIG. 23 shows a state that the fingerprint information obtained from the first fingerprint sensor 281 is used to log in to a site related to financial transactions.

Figure 24:
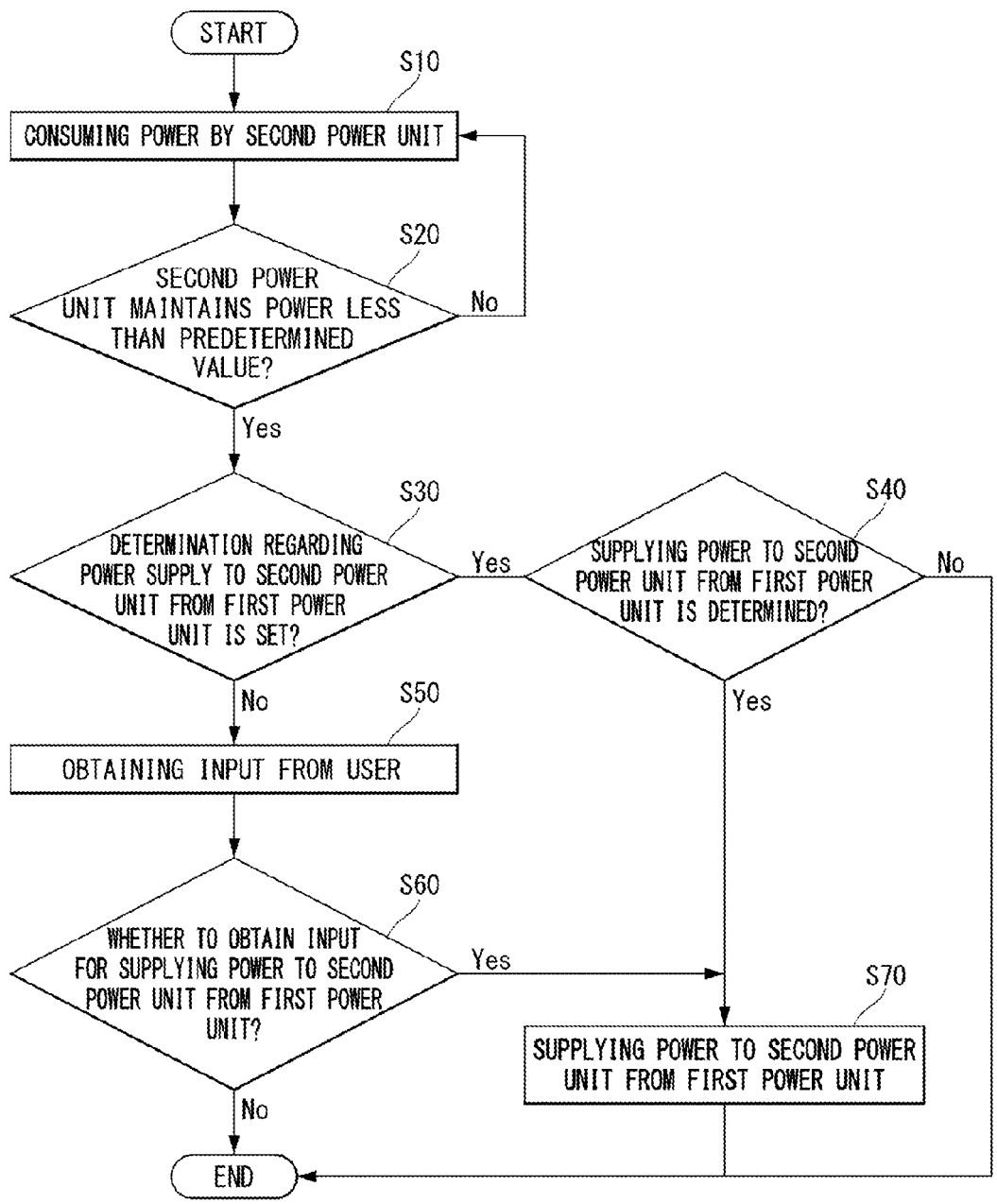
FIG. 24 is a flow chart related to movement of power between a first power unit and a second power unit according to an embodiment of the invention.

FIG. 24 is a flow chart related to movement of power between a first power unit and a second power unit according to an embodiment of the invention. The first power unit 240 may supply power to the first display 230, the watch movement 260, the first touch sensor 280, the first fingerprint sensor 281, and the like. The second power unit 340 may supply power to the second display 330, the circuit board 350, and the like.

When the power charged to the second power unit 340 is depleted, the second display 330, the circuit board 350, and the like may not be able to operate. The first power unit 240 may not supply power to the second watch module 300 in order to provide permanent function as a mechanical watch of the first watch module 200. However, when the power charged to the second power unit 340 is depleted, and the use of the second watch module 300 is urgent, the second watch module 300 need to receive the power from the first power unit 240.

The second watch module 300 may receive power from the first power unit 240 by an auto set or receive power from the first power unit 240 by the user's input. The method that the second watch module 300 receives power from the first power unit 240 may be the method that the second power unit 340 receives power from the first power unit 240. The controller 180 may control the first power unit 240 to supply power to the second power unit 340. When the power of the second power unit 340 is insufficient, it is described about the method that the controller 180 controls the first power unit 240 to supply power to the second power unit 340.

The method that the controller 180 controls the first power unit 240 to supply power to the second power unit 340 may include a step S10 for consuming the power by the second power unit 340. When the second display 330 and the circuit board 350 operate, the power of the second power unit 340 can be consumed. The second power unit 340 consumes the power, and then a value of the power may be less than a predetermined value. The second power unit 340 may be charged to be supplied with power from an external power source, or the second power unit 340 may have a power less than the predetermined value. The predetermined value may be set by the user.

It is necessary to determine whether the second power unit 340 has a power less than the predetermined value. Therefore, the method that the controller 180 controls the first power unit 240 to supply power to the second power unit 340 may include a step S20 for determining whether the second power unit 340 maintains the power less than the predetermined value.

When the second power unit 340 maintains the power in excess of the predetermined value, the power of the second power unit 340 may be continuously consumed. When the second power unit 340 maintains the power less than the predetermined value, the power supply to the second power unit 340 can be a problem. The method that the controller 180 controls the first power unit 240 to supply power to the second power unit 340 may include a step S30 for determining whether determination regarding the power supply to the second power unit 340 from the first power unit 240 is set.

If it is an automatic setting with respect to the power supply to the second power unit 340 from the first power unit 240, it is necessary to determine whether to automatically supply the power. The method that the controller 180 controls the first power unit 240 to supply power to the second power unit 340 may include a step S40 for determining whether the power supply to the second power unit 340 from the first power unit 240 is determined.

If it is not set to supply the power to the second power unit 340 from the first power unit 240, the method that the second power unit 340 receives the power from the first power unit 240 may end. If it is set to supply power to the second power unit 340 from the first power unit 240, the controller 180 may control to supply the power to the second power unit 340 from the first power unit 240. That is, the method that the controller 180 controls to supply the power to the second power unit 340 from the first power unit 240 may include a step S70 for supplying the power to the second power unit 340 from the first power unit 240 by the controller 180.

If it is not an automatic setting with respect to the power supply to the second power unit 340 from the first power unit 240, it may be provided with input from the user. That is, the method that the controller 180 controls to supply the power to the second power unit 340 from the first power unit 240 may include a step S50 for obtaining an input from the user.

The method that the controller 180 controls to supply the power to the second power unit 340 from the first power unit 240 may include a step S60 for determining whether to obtain an input for supplying the power to the second power unit 340 from the first power unit 240. If an input for supplying the power to the second power unit 340 from the first power unit 240 is obtained, the controller 180 may supply the power to the second power unit 340 from the first power unit 240. If an input for supplying the power to the second power unit 340 from the first power unit 240 is not obtained, the method that the controller 180 supply the power to the second power unit 340 from the first power unit 240 may end.

Figure 25:
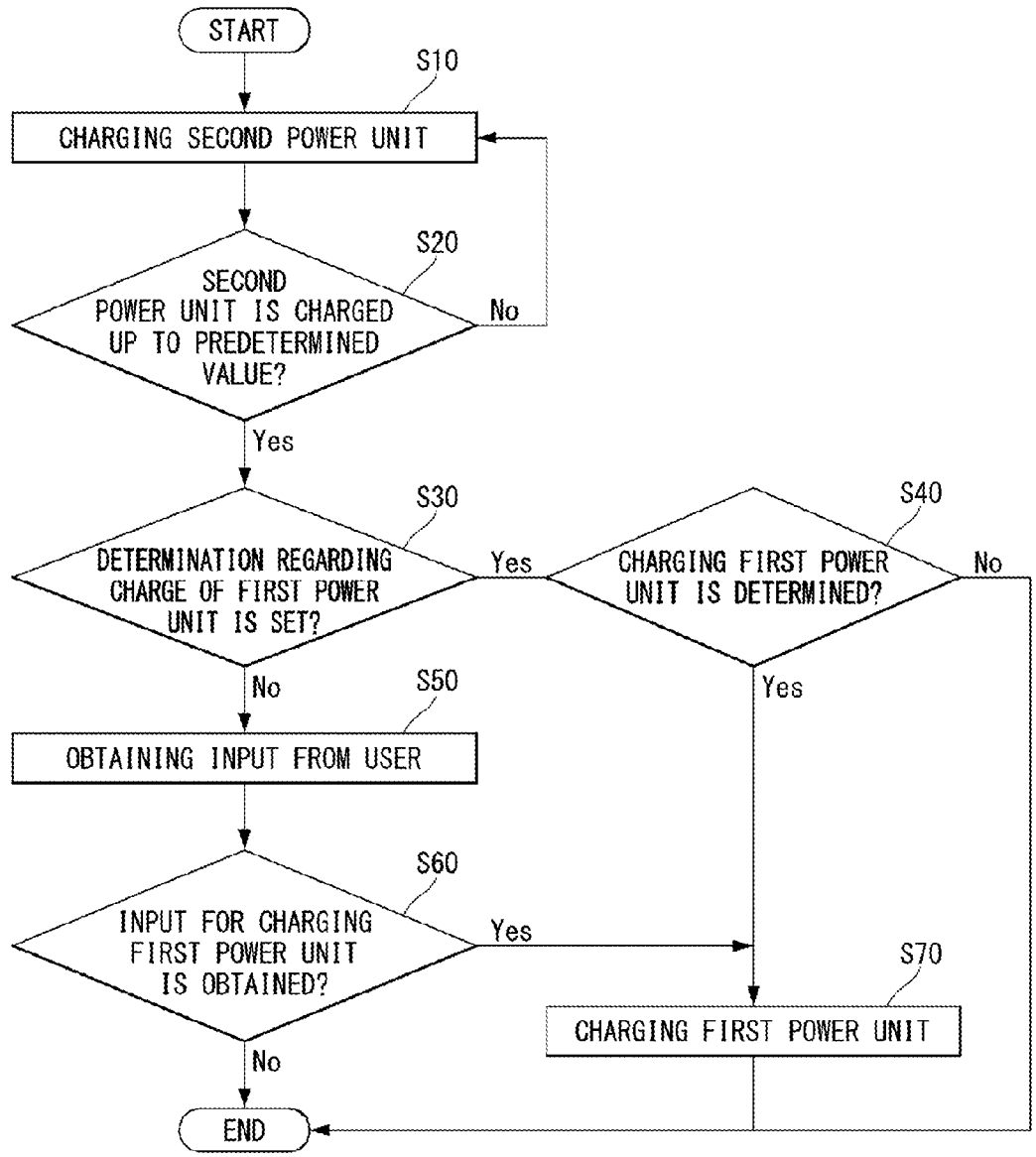
FIG. 25 is a flow chart related to charge of a first power unit during charging of a second power unit according to an embodiment of the invention.

FIG. 25 is a flow chart related to charge of a first power unit during charging of a second power unit according to an embodiment of the invention. The second power unit 340 may be charged from an external power source. The second power unit 340 may be connected to the second display 330, the circuit board 350, and the antenna 540 and supply power to them. Therefore, the power consumption of the second power unit 340 may be greater than the power consumption of the first power unit 240.

The first watch module 200 may provide functions of a general mechanical watch. The first power unit 240 may be a battery provided in the general mechanical watch. The battery provided in the general mechanical watch may not be able to be charged, the first power unit 240 according to an embodiment of the present invention can be charged.

The second power unit 340 may need to be charged by being supplied with power from an external power source periodically or intermittently. As compared to the second power unit 340, its frequency may be low, but the first power unit 240 may also need to be charged. When the second power unit 340 is charged from the external power source, a method for charging the first power unit 240 is described below.

The charge of the first power unit 240 may be base on a premise of the charge of the second power unit 340. Therefore, the method of charging the first power unit 240 may include a step S10 for charging the second power unit 340.

The method of charging the first power unit 240 may include a step S20 for determining whether the second power unit 340 is charged up to a predetermined value. If the second power unit 340 has not been charged to the predetermined value, it is possible to continue charging the second power unit 340.

The method of charging the first power unit 240 may include a step S30 for determining whether determination regarding the charge of the first power unit 240 is set. If the second power unit 340 is charged up to the predetermined value (for example, 95%), it is necessary to determine whether the setting is automatic with respect to the charge of the first power unit 240.

The method of charging the first power unit 240 may include a step S40 for determining whether charging the first power unit 240 is determined. If the setting is automatic with respect to the charge of the first power unit 240, a step for determining whether the setting for charging the first power unit 240 exists may be necessary.

The method of charging the first power unit 240 may include a step S70 for charging the first power unit 240. It is possible to charge the first power unit 240 in case there is a setting for charging the first power unit 240. The first power unit 240 may be charged by being supplied with power from at least one of the second power unit 340 or an external power source.

The method of charging the first power unit 240 may include a step S50 for obtaining an input from a user. If the setting is not automatic with respect to the charge of the first power unit 240, it may be necessary to obtain the input from the user by manual system.

The method of charging the first power unit 240 may include a step S60 for determining whether an input for charging the first power input 240 is obtained. If an input for charging the first power input 240 is obtained, it is possible to charge the first power unit 240. On the other watch hand, if an input for charging the first power input 240 is not obtained, the method of charging the first power unit 240 may end.

The embodiments or any other embodiments of the present invention described above are not intended to be exclusive or distinguished from each other. The embodiments or any other embodiments of the present invention described above may be used together or in combination.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a first watch module including:
      a first body,
      a watch movement located in the first body,
      a first window connected to the first body,
      a watch hand located between the watch movement and the first window, connected to the watch movement, and receiving driving power from the watch movement, and
      a first display located between the first window and the watch hand; and
   a second watch module including:
      a second body extended from the first body,
      a circuit board located in at least one of the first body or the second body,
      a second window connected to the second body, the second window formed integrally with the first window, and
      a second display located between the circuit board and the second window, and connected to the circuit board,
   wherein the first body and the second body form a bending so that a direction which the first window faces outwards is different from a direction which the second window faces outwards, and the first body and the second body are internally connected to each other,
   wherein the first display is in one of display states including:
      a first display state in which the watch hand is projected through the first window, and information is displayed on the first display,
      a second display state in which the watch hand is projected through the first window, but information is not displayed on the first display, and
      a third display state in which the watch hand is not projected through the first window, and information is displayed on the first display.

2. The electronic device of claim 1, wherein the first body includes:
   a first upper part at which the first window is located; and
   a first lower part, opposite to the first upper part, and forming a part of an outer surface of the first body, and
   wherein the second body includes:
   a second upper part at which the second window is located; and
   a second lower part, opposite to the second upper part, and forming a part of an outer surface of the second body.

3. The electronic device of claim 2, wherein the second upper part forms an inclination with respect to the second lower part.

4. The electronic device of claim 3, wherein the inclination is formed along a direction from the first watch module to the second watch module.

5. The electronic device of claim 3, wherein the inclination is formed along a direction perpendicular to another direction from the first watch module to the second watch module.

6. The electronic device of claim 2, further comprising:
   a third body internally connecting the first body and the second body; and
   a third watch module including a third window through which the first window and the second window are connected,
   wherein the third body includes:
      a third upper part at which the third window is located; and
      a third lower part, opposite to the third upper part, and forming a part of an outer surface of the third body.

7. The electronic device of claim 6, wherein the third upper part connects the first upper part to the second upper part, and the third lower part connects the first lower part to the second lower part.

8. The electronic device of claim 7, wherein a radius of curvature of the third lower part is smaller than a radius of curvature of the third upper part.

9. The electronic device of claim 1, wherein the first watch module further includes a first power unit which supplies power to the watch movement, and
   wherein the second watch module further includes a second power unit which supplies power to the circuit board, and is charged by an external power source.

10. The electronic device of claim 9, further comprising:
    a controller which is connected to the first power unit and the second power unit, wherein the controller is configured to supply power to the second power unit from the first power unit in accordance to an input received from the second display.

11. The electronic device of claim 9, further comprising:
    a controller which is connected to the first power unit and the second power unit, wherein the controller is configured to supply power to the second power unit from the first power unit in accordance to an input received from the first display.

12. The electronic device of claim 9, further comprising:
    a controller which is connected to the first power unit and the second power unit, wherein the controller is configured to charge the first power unit from at least one of the second power unit or the external power source when the second power unit is charged by the external power source.

13. The electronic device of claim 1, wherein the first window includes a touch sensor configured to sense a touch input, and
    wherein the electronic device further comprises a controller configured to receive an input from the touch sensor and process the input.

14. The electronic device of claim 13, wherein the touch sensor includes a fingerprint sensor configured to receive a user's fingerprint information.

* * * * *